US012732314B2

(12) United States Patent
Zhang et al.

(10) Patent No.: US 12,732,314 B2
(45) Date of Patent: Sep. 8, 2026

(54) TIME FREQUENCY RESOURCE MAPPING FOR WIDEBAND SYSTEMS

(71) Applicant: QUALCOMM Incorporated, San Diego, CA (US)

(72) Inventors: Li Zhang, San Diego, CA (US); Wei Yang, San Diego, CA (US); Hari Sankar, San Diego, CA (US); Jing Jiang, San Diego, CA (US); Jing Sun, San Diego, CA (US); Jia Fei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 363 days.

(21) Appl. No.: 18/468,300

(22) Filed: Sep. 15, 2023

(65) Prior Publication Data

US 2025/0097906 A1 Mar. 20, 2025

(51) Int. Cl.
*H04L 5/00* (2006.01)

(52) U.S. Cl.
CPC .......... *H04L 5/0005* (2013.01); *H04L 5/0094* (2013.01)

(58) Field of Classification Search
CPC .... H04L 5/0005; H04L 5/0044; H04L 5/0094
See application file for complete search history.

(56) References Cited

U.S. PATENT DOCUMENTS

2017/0245313 A1* 8/2017 Kim ...................... H04L 1/1671
2019/0280818 A1* 9/2019 Renfors ............ H04L 27/26524
2020/0120693 A1* 4/2020 Wu ................... H04W 72/1263
2020/0228992 A1 7/2020 Tsai et al.
2022/0132567 A1* 4/2022 Lee .................. H04W 74/0808
2023/0247663 A1* 8/2023 Zhu ....................... H04L 5/0044 370/329
2025/0062878 A1* 2/2025 Liu ....................... H04L 5/0057

FOREIGN PATENT DOCUMENTS

EP 3641443 B1 8/2022

OTHER PUBLICATIONS

International Search Report and Written Opinion—PCT/US2024/041882—ISA/EPO—Nov. 19, 2024.

LG Electronics: "Wide-Band Operation for NR-U", 3GPP TSG RAN WG1 #96, R1-1902044, 3rd Generation Partnership Project (3GPP), Mobile Competence Centre, 650, Route Des Lucioles, F-06921, Sophia-Antipolis Cedex, France, vol. RAN WG1, No. Athens, Greece, Feb. 25, 2019-Mar. 1, 2019, Feb. 16, 2019, 6 Pages, XP051599740, Section "PDSCH Mapping" and Proposal 4, p. 4, Figure 1.

* cited by examiner

*Primary Examiner* — Pao Sinkantarakorn
(74) *Attorney, Agent, or Firm* — Holland & Hart LLP

(57) ABSTRACT

Methods, systems, and devices for wireless communications are described. A first wireless device may communicate an allocation of a set of time-frequency resources of a carrier for transmission of a first codeword. The first wireless device may map a first portion of the first codeword to resource elements of a first subband of the set of time-frequency resources in a frequency-first, time-second manner and a second portion of the first codeword to resource elements of a second subband of the set of time-frequency resources in the frequency-first, time-second manner. The first portion of the first codeword may include a contiguous portion of the first codeword preceding the second portion of the first codeword. The first wireless device may transmit, within the set of time-frequency resources, the first codeword based on the mapping.

28 Claims, 17 Drawing Sheets

TIME FREQUENCY RESOURCE MAPPING FOR WIDEBAND SYSTEMS

FIELD OF TECHNOLOGY

The present disclosure relates to wireless communications, including time frequency resource mapping for wideband systems.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE). A wireless device may communicate via orthogonal frequency division multiplexing (OFDM) waveforms.

SUMMARY

The described techniques relate to improved methods, systems, devices, and apparatuses that support time frequency resource mapping for wideband systems. For example, the described techniques provide for communicating, by a first wireless device, an allocation of a set of time-frequency resources of a carrier for transmission of a first codeword. The first wireless device may map a first portion of the first codeword to resource elements of a first subband of the set of time-frequency resources in a frequency-first, time-second manner and a second portion of the first codeword to resource elements of a second subband of the set of time-frequency resources in the frequency-first, time-second manner. The first portion of the first codeword may include a contiguous portion of the first codeword that precedes the second portion of the first codeword. The first wireless device may transmit, within the set of time-frequency resources, the first codeword based on the mapping.

A method for wireless communications by a first wireless device is described. The method may include communicating an allocation of a set of time-frequency resources for transmission of a first codeword, mapping, a first portion of the first codeword to resource elements of a first subband of the set of time-frequency resources in a frequency-first, time-second manner and a second portion of the first codeword to resource elements of a second subband of the set of time-frequency resources in the frequency-first, time-second manner, where the first portion of the first codeword includes a contiguous portion of the first codeword that precedes the second portion of the first codeword, and transmitting, within the set of time-frequency resources, the first codeword based on the mapping.

A first wireless device for wireless communications is described. The first wireless device may include one or more memories storing processor executable code, and one or more processors coupled with the one or more memories. The one or more processors may individually or collectively operable to execute the code to cause the first wireless device to communicate an allocation of a set of time-frequency resources for transmission of a first codeword, mapping, a first portion of the first codeword to resource elements of a first subband of the set of time-frequency resources in a frequency-first, time-second manner and a second portion of the first codeword to resource elements of a second subband of the set of time-frequency resources in the frequency-first, time-second manner, where the first portion of the first codeword includes a contiguous portion of the first codeword that precedes the second portion of the first codeword, and transmit, within the set of time-frequency resources, the first codeword based on the mapping.

Another first wireless device for wireless communications is described. The first wireless device may include means for communicating an allocation of a set of time-frequency resources for transmission of a first codeword, means for mapping, a first portion of the first codeword to resource elements of a first subband of the set of time-frequency resources in a frequency-first, time-second manner and a second portion of the first codeword to resource elements of a second subband of the set of time-frequency resources in the frequency-first, time-second manner, where the first portion of the first codeword includes a contiguous portion of the first codeword that precedes the second portion of the first codeword, and means for transmitting, within the set of time-frequency resources, the first codeword based on the mapping.

A non-transitory computer-readable medium storing code for wireless communications is described. The code may include instructions executable by a processor to communicate an allocation of a set of time-frequency resources for transmission of a first codeword, mapping, a first portion of the first codeword to resource elements of a first subband of the set of time-frequency resources in a frequency-first, time-second manner and a second portion of the first codeword to resource elements of a second subband of the set of time-frequency resources in the frequency-first, time-second manner, where the first portion of the first codeword includes a contiguous portion of the first codeword that precedes the second portion of the first codeword, and transmit, within the set of time-frequency resources, the first codeword based on the mapping.

In some examples of the method, first wireless devices, and non-transitory computer-readable medium described herein, the first codeword includes a set of multiple code blocks, and where of the first portion of the first codeword includes a first subset of the set of multiple code blocks and the second portion of the first codeword includes a second subset of the set of multiple code blocks, and where the first subset and the second subset of the set of multiple code blocks may be disjoint subsets.

In some examples of the method, first wireless devices, and non-transitory computer-readable medium described herein, a first code block of the second subset of the set of multiple code blocks begins on a first resource element of the second subband.

Some examples of the method, first wireless devices, and non-transitory computer-readable medium described herein may further include operations, features, means, or instructions for receiving, from a second wireless device, an indication of a threshold subband size, where a size of the first subband, the second subband, or both may be based on the indication.

In some examples of the method, first wireless devices, and non-transitory computer-readable medium described herein, the indication includes a capability associated with a component carrier size or a quantity of layers.

Some examples of the method, first wireless devices, and non-transitory computer-readable medium described herein may further include operations, features, means, or instructions for communicating an indication of a configuration for mapping the first codeword according to a set of subbands, the set of subbands including the first subband and the second subband.

Some examples of the method, first wireless devices, and non-transitory computer-readable medium described herein may further include operations, features, means, or instructions for receiving one or more second codewords via a second set of time-frequency resources, where a first portion of the one or more second codewords may be mapped across frequency resources of a first time resource of the second set of time-frequency resources prior to mapping of a second portion of the one or more second codewords across the frequency resources of a second time resource of the second set of time-frequency resources.

Some examples of the method, first wireless devices, and non-transitory computer-readable medium described herein may further include operations, features, means, or instructions for mapping the first codeword according to the first subband and the second subband may be based on identifying a waveform type associated with transmitting the first codeword.

Some examples of the method, first wireless devices, and non-transitory computer-readable medium described herein may further include operations, features, means, or instructions for communicating the allocation includes communicating one or more parameters, and where mapping the first codeword according to the first subband and the second subband may be based on the one or more parameters.

In some examples of the method, first wireless devices, and non-transitory computer-readable medium described herein, the one or more parameters include a quantity of layers, and where mapping the first codeword according to the first subband and the second subband may be based on the quantity of layers exceeding a threshold quantity of layers.

In some examples of the method, first wireless devices, and non-transitory computer-readable medium described herein, the one or more parameters include a transmission bandwidth, and where mapping the first codeword according to the first subband and the second subband may be based on the transmission bandwidth exceeding a threshold transmission bandwidth.

Some examples of the method, first wireless devices, and non-transitory computer-readable medium described herein may further include operations, features, means, or instructions for communicating an indication of a subband size associated with the first subband, the second subband, or both.

In some examples of the method, first wireless devices, and non-transitory computer-readable medium described herein, the indication of the subband size may be communicated via a radio resource control (RRC) message, a downlink control information (DCI) message, an uplink control information (UCI) message, or a medium access control-control element (MAC-CE) message.

Some examples of the method, first wireless devices, and non-transitory computer-readable medium described herein may further include operations, features, means, or instructions for determining a subband size associated with the first subband, the second subband, or both based on one or more parameters associated with the transmission.

In some examples of the method, first wireless devices, and non-transitory computer-readable medium described herein, one or more parameters include one or more layers, one or more symbols, a scheduled bandwidth, or a combination thereof.

In some examples of the method, first wireless devices, and non-transitory computer-readable medium described herein,, for each of a set of multiple physical resource block groups of a set of physical resources, the mapping may include operations, features, means, or instructions for mapping respective sets of virtual resource blocks to each physical resource block group, where the respective sets of virtual resource blocks mapped to each of the physical resource block groups may be from a same subband of the set of multiple subbands or one or more consecutive subbands of the set of multiple subbands.

In some examples of the method, first wireless devices, and non-transitory computer-readable medium described herein, transmitting the first codeword includes transmitting the first codeword via one or more first spatial layers.

In some examples of the method, first wireless devices, and non-transitory computer-readable medium described herein, mapping the first codeword may include operations, features, means, or instructions for mapping the first codeword to resource elements of the one or more first spatial layers and mapping, based on mapping the first codeword to the resource elements of the one or more first spatial layers, the first portion of the first codeword to the resource elements of the first subband and the second portion of the first codeword to the resource elements of the second subband.

Some examples of the method, first wireless devices, and non-transitory computer-readable medium described herein may further include operations, features, means, or instructions for transmitting a second codeword via one or more second spatial layers, where the one or more second spatial layers and the one or more first spatial layers may be different.

A method for wireless communications by a second wireless device is described. The method may include communicating an allocation of a set of time-frequency resources for transmission of a first codeword, receiving, within the set of time-frequency resources, the first codeword, and processing a first portion of the first codeword from resource elements of a first subband of the set of time-frequency resources in a time-first, frequency-second manner and a second portion of the first codeword from resource elements of a second subband of the set of time-frequency resources in the time-first, frequency-second manner, where the first portion of the first codeword includes a contiguous portion of the first codeword that precedes the second portion of the first codeword.

A second wireless device for wireless communications is described. The second wireless device may include one or more memories storing processor executable code, and one or more processors coupled with the one or more memories. The one or more processors may individually or collectively operable to execute the code to cause the second wireless device to communicate an allocation of a set of time-frequency resources for transmission of a first codeword, receive, within the set of time-frequency resources, the first codeword, and process a first portion of the first codeword from resource elements of a first subband of the set of time-frequency resources in a time-first, frequency-second manner and a second portion of the first codeword from resource elements of a second subband of the set of time-frequency resources in the time-first, frequency-second manner, where the first portion of the first codeword includes a contiguous portion of the first codeword that precedes the second portion of the first codeword.

Another second wireless device for wireless communications is described. The second wireless device may include means for communicating an allocation of a set of time-frequency resources for transmission of a first codeword, means for receiving. within the set of time-frequency resources, the first codeword, and means for processing a first portion of the first codeword from resource elements of a first subband of the set of time-frequency resources in a time-first, frequency-second manner and a second portion of the first codeword from resource elements of a second subband of the set of time-frequency resources in the time-first, frequency-second manner, where the first portion of the first codeword includes a contiguous portion of the first codeword that precedes the second portion of the first codeword.

A non-transitory computer-readable medium storing code for wireless communications is described. The code may include instructions executable by a processor to communicate an allocation of a set of time-frequency resources for transmission of a first codeword, receive, within the set of time-frequency resources, the first codeword, and process a first portion of the first codeword from resource elements of a first subband of the set of time-frequency resources in a time-first, frequency-second manner and a second portion of the first codeword from resource elements of a second subband of the set of time-frequency resources in the time-first, frequency-second manner, where the first portion of the first codeword includes a contiguous portion of the first codeword that precedes the second portion of the first codeword.

Some examples of the method, second wireless devices, and non-transitory computer-readable medium described herein may further include operations, features, means, or instructions for storing one or more first channel estimates associated with the first subband based on the processing and storing one or more second channel estimates associated with the second subband based on the processing, where storing the one or more second channel estimates includes overwriting at least a portion of the stored one or more first channel estimates.

In some examples of the method, second wireless devices, and non-transitory computer-readable medium described herein, the first codeword includes a set of multiple code blocks, and where of the first portion of the first codeword includes a first subset of the set of multiple code blocks and the second portion of the first codeword includes a second subset of the set of multiple code blocks, and where the first subset and the second subset of the set of multiple code blocks may be disjoint subsets.

In some examples of the method, second wireless devices, and non-transitory computer-readable medium described herein, a first code block of the second subset of the set of multiple code blocks begins on a first resource element of the second subband.

Some examples of the method, second wireless devices, and non-transitory computer-readable medium described herein may further include operations, features, means, or instructions for transmitting an indication of a threshold subband size, where a size of the first subband, the second subband, or both may be based on the indication.

In some examples of the method, second wireless devices, and non-transitory computer-readable medium described herein, the indication includes a capability associated with a component carrier size or a quantity of layers.

Some examples of the method, second wireless devices, and non-transitory computer-readable medium described herein may further include operations, features, means, or instructions for transmitting one or more second codewords via a second set of time-frequency resources, where a first portion of the one or more second codewords may be mapped across frequency resources of a first time resource of the second set of time-frequency resources prior to mapping of a second portion of the one or more second codewords across the frequency resources of a second time resource of the second set of time-frequency resources.

Some examples of the method, second wireless devices, and non-transitory computer-readable medium described herein may further include operations, features, means, or instructions for communicating an indication of a subband size associated with the first subband, the second subband, or both.

In some examples of the method, second wireless devices, and non-transitory computer-readable medium described herein, the indication of the subband size may be communicated via an RRC message, a DCI message, a UCI message, or a MAC-CE message.

Some examples of the method, second wireless devices, and non-transitory computer-readable medium described herein may further include operations, features, means, or instructions for receiving the first codeword includes receiving the first codeword across one or more first spatial layers.

Some examples of the method, second wireless devices, and non-transitory computer-readable medium described herein may further include operations, features, means, or instructions for receiving a second codeword via one or more second spatial layers, where the one or more second spatial layers and the one or more first spatial layers may be different.

DETAILED DESCRIPTION

Figure 1:
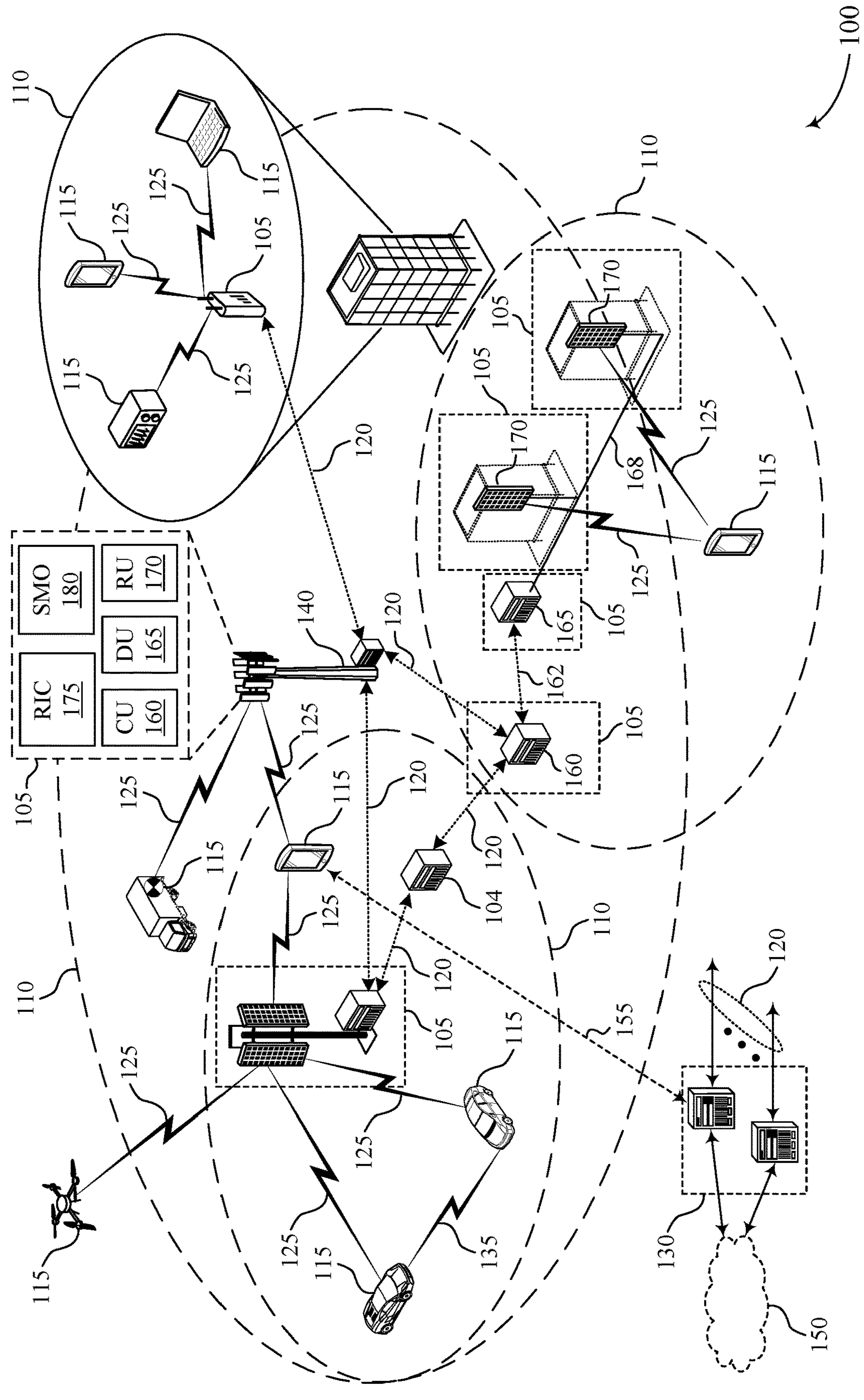
FIG. 1 shows an example of a wireless communications system that supports time frequency resource mapping for wideband systems in accordance with one or more aspects of the present disclosure.

In some cases, one or more wireless devices may communicate using a cyclic-prefix orthogonal frequency-division multiplexing (CP-OFDM) waveform. For example, a first wireless device may perform resource element mapping for a modulated symbol stream associated with one or more codewords (e.g., a transport block). The first wireless device may perform resource element mapping by order of codeword, layer, frequency, then time. For example, the first wireless device, for a first layer of one or more layers, may map a first codeword of the one or more codewords to one or more resource elements in a frequency-first, time-second manner. That is, the first wireless device may map the first codeword across a frequency domain (e.g., subcarriers), then across a time domain (e.g., OFDM symbols).

In some examples, a second wireless device may receive the one or more codewords from the first wireless device. The second wireless device may store (e.g., buffer) one or more received samples, one or more channel estimates, or both across a bandwidth of the frequency domain to decode one or more code blocks (e.g., in a transport block). In some cases, an increase in the bandwidth of the frequency domain, an increase in a quantity of layers (e.g., multiple input multiple output (MIMO) layers), or both may be associated with increased processing by the second wireless device (e.g., the receiving device). For example, the second wireless device may store more samples, more channel estimates, or both as bandwidth and the quantity of layers increase.

As described herein, the first wireless device may map the one or more codewords according to one or more subbands of the frequency domain. For example, the first wireless device, for the first layer of the one or more layers, may map a first portion of a first codeword of the one or more codewords to one or more resource elements of a first subband of the frequency domain. The first wireless device may then map, for the first layer, a second portion of the first codeword to one or more resource elements of a second subband of the frequency domain. The first portion of the first codeword may precede the second portion of the first codeword, and the first portion and the second portion may be contiguous.

The second wireless device may receive the first codeword and store the one or more samples, the one or more channel estimates, or both for a subband at a time. For example, the second wireless device may process the first portion of the first codeword and store corresponding samples, channel estimates, or both. Then, the second wireless device may process the second portion of the first codeword and store corresponding samples, channel estimates, or both by overwriting at least a portion of the samples, channel estimates, or both for the first subband. As such, the second wireless device may reduce memory usage.

Aspects of the disclosure are initially described in the context of wireless communications systems. Aspects of the disclosure are also described in the context of resource element mapping diagrams. Aspects of the disclosure are further illustrated by and described with reference to apparatus diagrams, system diagrams, and flowcharts that relate to time frequency resource mapping for wideband systems.

FIG. 1 shows an example of a wireless communications system 100 that supports time frequency resource mapping for wideband systems in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes

104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support time frequency resource mapping for wideband systems as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking. Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some examples, the network entity 105 may communicate an allocation of a set of time-frequency resources of a carrier for transmission of a first codeword. For example, the network entity 105 may map a first portion of the first codeword to resource elements of a first subband of the set of time-frequency resources in a frequency-first, time-second manner. The network entity 105 may map a second portion of the first codeword to resource elements of a second subband of the set of time-frequency resources in a frequency-first, time-second manner. In some examples, the first portion of the codeword may include a contiguous portion of the first codeword preceding the second portion of the first codeword. In some examples, the network entity may transmit the first codeword within the set of time-frequency resources to the UE 115.

The UE 115 may receive, within the set of time-frequency resources, the first codeword. Additionally, or alternatively, the UE 115 may store one or more first channel estimates associated with the first subband based on processing the first portion of the first codeword. The UE 115 may store one or more second channel estimates associated with the second subband based on processing the second portion of the first codeword. In some cases, storing the one or more second channel estimates may include overwriting at least a portion of the one or more first channel estimates.

Figure 2:
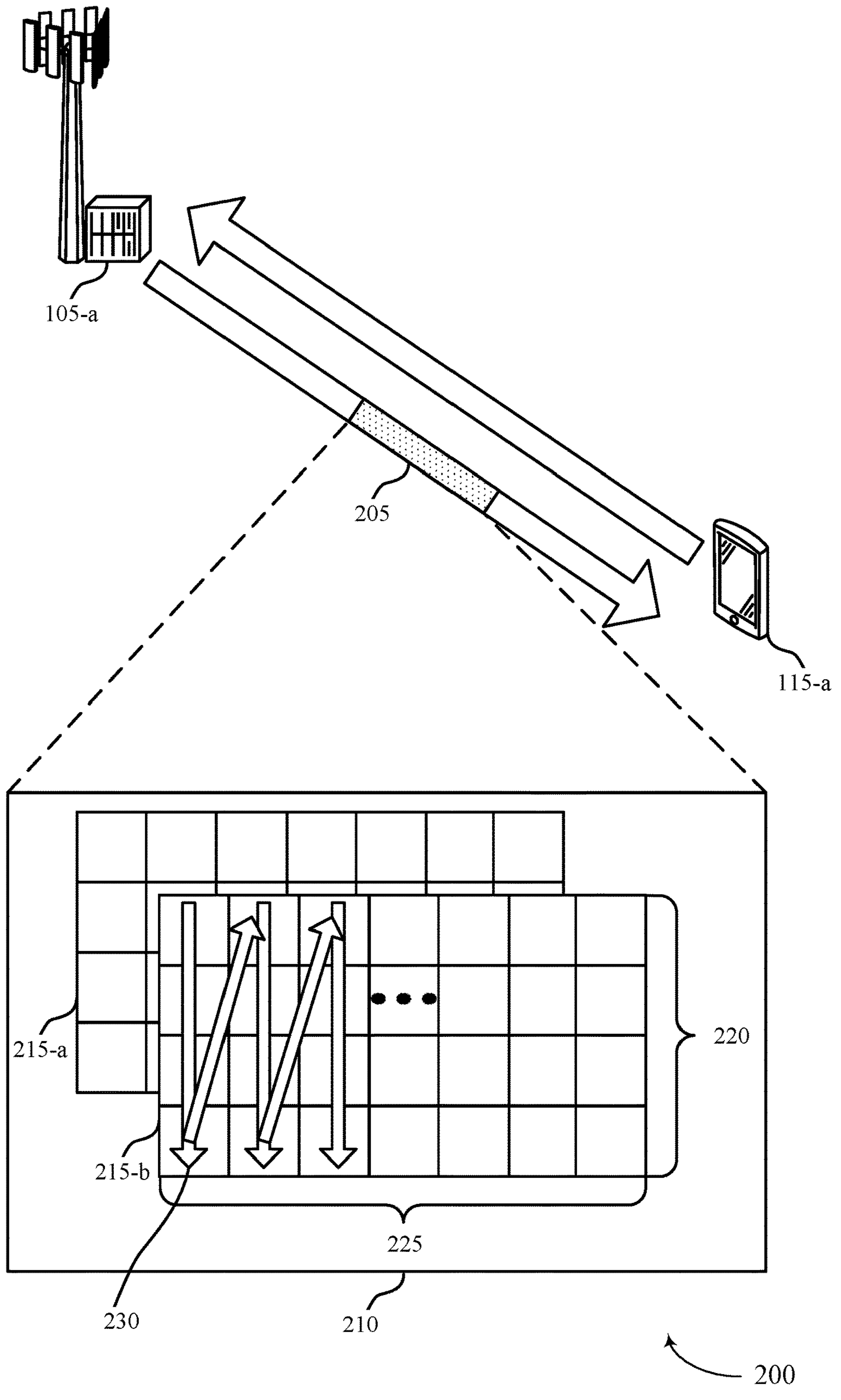
FIG. 2 shows an example of a wireless communications system that supports time frequency resource mapping for wideband systems in accordance with one or more aspects of the present disclosure.

FIG. 2 shows an example of a wireless communications system 200 that supports time frequency resource mapping for wideband systems in accordance with one or more aspects of the present disclosure.

The wireless communications system 200 may implement or be implemented by aspects of the wireless communications system 100. For example, the wireless communications system 200 may include a network entity 105-*a* and a UE 115-*a,* which may represent examples of a network entity 105 and a UE 115, respectively, as described with reference to FIG. 1. The network entity 105-*a,* the UE 115-*a,* or both may communicate one or more codewords mapped to a resource element.

For example, the network entity 105-*a,* the UE 115-*a,* or both may communicate according to an OFDM waveform (e.g., a CP-OFDM waveform). The network entity 105-*a,* the UE 115-*a,* or both may map one or more symbols (e.g., modulated symbols of a symbol stream) associated with respective codewords according to a first mapping rule 210. For example, the network entity 105-*a* may transmit a message 205 to the UE 115-*a* (e.g., or the UE 115-*a* may transmit a message 205 to the network entity 105-*a*) where the message 205 includes at least a first codeword.

The network entity 105-*a* may map the first codeword according to the first mapping rule 210. For example, the network entity 105-*a* may map the first codeword in a frequency-first, time-second manner 230. That is, the network entity 105-*a* may map the first codeword across a frequency domain 220 (e.g., subcarriers) of a first time domain resource (e.g., OFDM symbol) of a time domain 225, then across the frequency domain 220 of a second time domain resource, and so on. The network entity 105-*a* may map the first codeword to one or more layers on time-frequency resources (e.g., including the frequency domain 220 and the time domain 225). For example, the network entity 105-*a* may map the first codeword in the layer 215-*a* in a frequency-first, time-second manner and then in the layer 215-*b* in a frequency-first, time-second manner. That is, the network entity 105-*a* may map the first codeword in a layer-first (e.g., spatial layer-first), frequency-second, time-third manner.

Additionally, or alternatively, the network entity 105-*a* may perform virtual resource block (VRB) to physical resource block (PRB) mapping (e.g., VRB to PRB frequency domain interleaving). For example, the mapping rule 210 may represent an example of virtual mapping where the resource elements correspond to one or more VRBs. In some cases, the network entity 105-*a* may perform VRB to PRB mapping for frequency diversity.

The UE 115-*a* may receive the message 205 including at least the first codeword. In some cases, the UE 115-*a* may process the first codeword from the resource elements of the frequency domain 220 in a frequency-first, time-second manner. For example, the UE 115-*a* may process the first codeword across the frequency domain 220 then across the time domain 225. In some examples, the UE 115-*a* may store one or more channel estimates associated with the frequency domain 220. For example, the UE 115-*a* may store the one or more channel estimates across a bandwidth (e.g., an entire bandwidth) to decode one or more code blocks in a transport block.

In some cases, the UE 115-*a* may store y samples (e.g., of the received signal). The y samples may scale (e.g., linearly) as a quantity of layers (e.g., MIMO layers) increases. Additionally, or alternatively, a quantity of channel estimates may scale (e.g., quadratically) as the quantity of layers increases. As such, an increase in the quantity of layers may be associated with increased buffer size at the UE 115-*a* as the y samples, the channel estimates, or both increase (e.g., increase linearly, quadratically, or both). In some cases, the increase in the quantity of layers may be associated with excessive memory usage at the UE 115-*a.*

As described herein, the network entity 105-*a* may map the one or more codewords according to a second mapping rule. For example, the second mapping rule may include mapping the first codeword across one or more subbands of the frequency domain 220. For example, the network entity 105-*a* may map a first portion of a first codeword of the one or more codewords to one or more resource elements in a frequency-first, time-second manner within a first subband of the frequency domain 220. The network entity 105-*a* may then map a second portion of the first codeword to one or more resource elements in a frequency-first, time-second manner within a second subband of the frequency domain 220. The first portion of the first codeword may precede the second portion of the first codeword, and the first portion and the second portion may be contiguous.

The UE 115-*a* may receive the first codeword and store the one or more samples, the one or more channel estimates, or both for a subband at a time. For example, the UE 115-*a* may process the first portion of the first codeword and store corresponding samples, channel estimates, or both. Then, the UE 115-*a* may process the second portion of the first codeword and store corresponding samples, channel estimates, or both by overwriting at least a portion of the channel estimates for the first subband. As such, the UE 115-*a* may reduce memory usage, buffering, or both.

Figure 3:
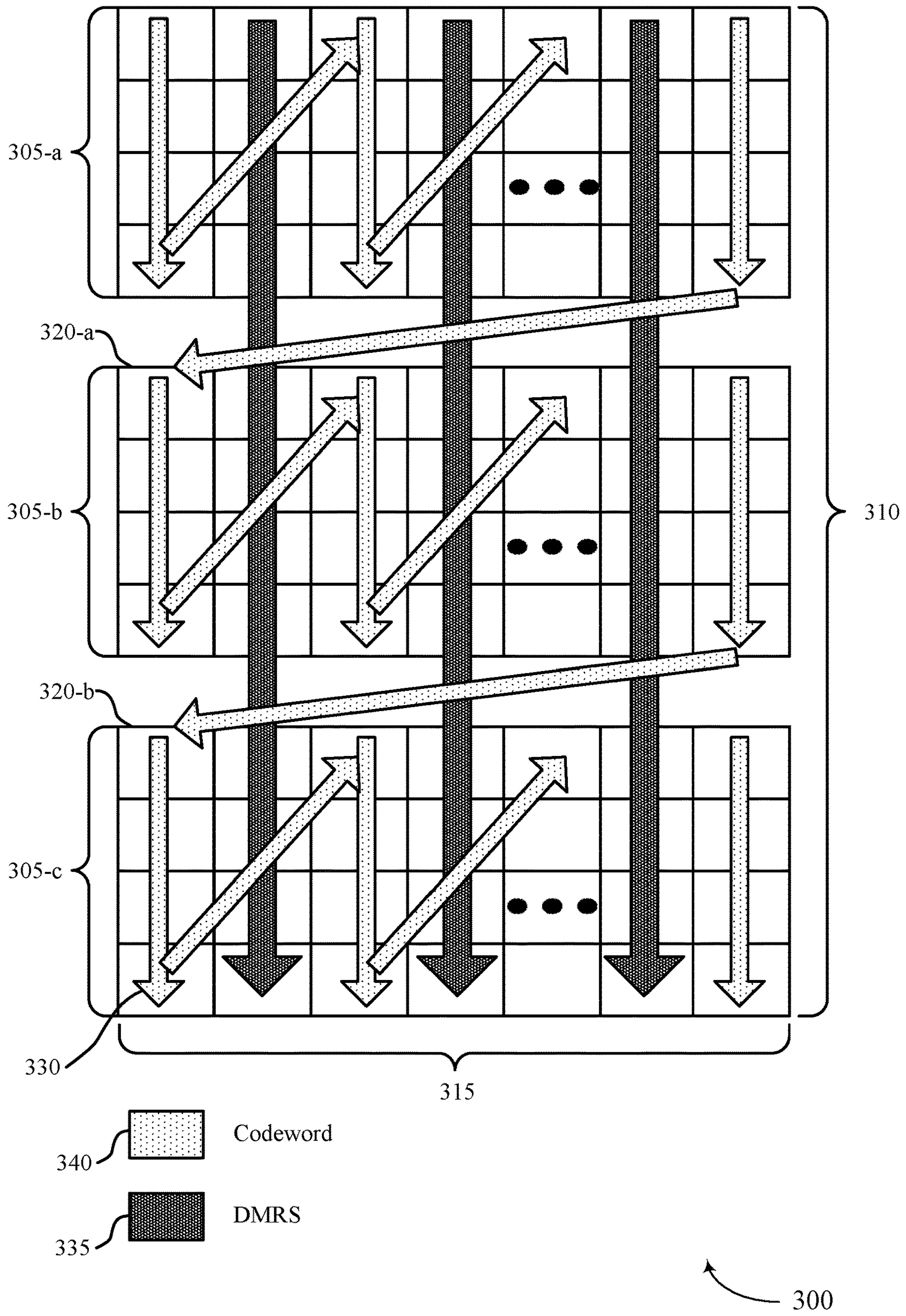
FIG. 3 shows an example of a resource element mapping diagram that supports time frequency resource mapping for wideband systems in accordance with one or more aspects of the present disclosure.

FIG. 3 shows an example of a resource element mapping diagram 300 that supports time frequency resource mapping for wideband systems in accordance with one or more aspects of the present disclosure.

The resource element mapping diagram 300 may implement or be implemented by aspects of the wireless communications system 100, the wireless communications system 200, or both. For example, the resource element mapping diagram 300 may be implemented by a network entity or a UE, which may represent examples of a network entity 105 and a UE 115, respectively, as described with reference to FIGS. 1 and 2.

A wireless device (e.g., a network entity, a UE, etc.) may map a first codeword 340 to resource elements of a plurality of subbands of a set of time-frequency resources in a frequency-first, time-second manner 330. For example, the wireless device may map, on a first layer of the one or more layers, a first portion of the first codeword 340 to a first set of resource elements of a subband 305-*a,* where the mapping is first across the frequency resources of the subband 305-*a* and then across time resources 315. For example, the wireless device may map a first subset of symbols of the first codeword across the subband 305-*a* for a first time resource. The wireless device may then map a second subset of symbols of the first codeword across the subband 305-*a* for a second time resource, and so on. That is, the wireless device may map the first codeword to resource elements of the subband 305-*a* in a frequency-first, time-second manner 330. The wireless device may map a second portion of the first codeword to a second set of resource elements of a subband 305-*b*, a third portion of the first codeword to a third set of resource elements of a subband 305-*c*, or both. Additionally, or alternatively, the wireless device may map the first codeword 340 to one or more layers. For example, the wireless device may map the first codeword 340 across a first spatial layer (e.g., MIMO layer) in a frequency-first, time-second manner 330 (e.g., according to the subbands) and then continue to map the first codeword 340 across a second spatial layer in a frequency-first, time-second manner 330 (e.g., according to the subbands).

Alternatively, the wireless device may map the first codeword 340 according to a spatial layer-first, frequency-second (e.g., in a given subband), time-third, and subband-last mapping rule. For example, the wireless device may map the first codeword to a first subband of a first layer in a frequency-first, time-second manner, then to the first subband of a second layer in the frequency-first, time-second manner, until the first subband is filled for each spatial layer, then proceed to the second subband for mapping across layers, frequency, and time resources. In some cases, the wireless device may map the first codeword 340 to the one or more layers (e.g., all layers) on a first frequency domain resource and a first time domain resource, and then to the one or more layers on a second frequency domain resource and the first time domain resource (e.g., until filling the frequency resources of the first time domain resources in the first subband). The wireless device may then map the first codeword 340 to the one or more layers (e.g., all layers) of the first frequency domain resource in a second time resource in the first subband, and after filling in the one or more layers of the frequency domain resources and the time domain resources of the first subband, the wireless device may map a second portion of the first codeword 340 codeword to the second subband according to the same rule (a spatial layer-first, frequency-second, time-third, and subband-last manner).

In some examples, frequency resources 310 may include a plurality of subbands including the subband 305-*a*, the subband 305-*b*, and the subband 305-*c*. For example, the wireless device may map the first codeword across the plurality of subbands (e.g., two or more subbands).

In some examples, the wireless device may perform mapping based on a transmission type. For example, the wireless device may perform subband-based mapping for a transmission including data (e.g., the first codeword). Additionally, or alternatively, the wireless device may map a demodulation reference signal (DMRS) 335 to the resource elements of the frequency resources 310 in a frequency-first, time-second manner. For example, the wireless device may map the DMRS 335 across the plurality of subbands in symbols allocated to the DMRS 335 (e.g., mapping a single DMRS sequence across multiple subbands of a DMRS symbol period). Additionally, or alternatively, the wireless device may map the DMRS 335 based on the subbands. For example, the wireless device may map a first portion of the DMRS 335 to the subband 305-*a* in the frequency-first, time-second manner 330, a second portion of the DMRS 335 to the subband 305-*b* in the frequency-first, time-second manner 330, a third portion of the DMRS 335 to the subband 305-*c* in the frequency-first, time-second manner 330, and so on. In some examples, the first portion, the second portion, and the third portion of the DMRS 335 may include respective DMRS sequences. For example, the first portion mapped to the subband 305-*a* may be associated with a first DMRS sequence, the second portion mapped to the subband 305-*b* may be associated with a second DMRS sequence, and so on.

The first codeword 340 may include a plurality of code blocks. For example, a codeword may include one or more transport blocks, and each transport block may include one or more code blocks, where a receiving device may decode each of the one or more code blocks separately (e.g., a transport block may be segmented into one or more code blocks, where channel coding may be performed separately for each code block). In some examples, the wireless device may terminate a code block of the plurality of code blocks at a subband boundary. For example, a first subset of the plurality of code blocks of the first codeword 340 may be associated with the subband 305-*a*, a second subset of the plurality of code blocks may be associated with the subband 305-*b*, and a third subset of the plurality of code blocks may be associated with the subband 305-*c*. The first subset of the plurality of code blocks may terminate at a boundary between the subband 305-*a* and the subband 305-*b* (e.g., the first subset of the plurality of code blocks may not be mapped across subband boundaries). For example, the second subset of the plurality of code blocks may begin on a resource element 320-*a* (e.g., a resource element having a lowest frequency resource index and time resource index of subband 305-*b*). Additionally, or alternatively, the second subset of the plurality of code blocks may terminate at a boundary between the subband 305-*b* and the subband 305-*c* (e.g., the second subset of the plurality of code blocks may not be mapped across subband boundaries). For example, the third subset of the plurality of code blocks may begin on a resource element 320-*b* of subband 305-*c* (e.g., a resource element having a lowest frequency resource index and time resource index of subband 305-*c*).

In some cases, the first subset, the second subset, and the third subset may be disjoint. For example, decoding of the first subset may not depend on one or more channel estimates associated with the subband 305-*b* or the subband 305-*c*, decoding of the second subset may not depend on one or more channel estimates associated with the subband 305-*a* or the subband 305-*c*, and so on based on each subband corresponding to disjoint subsets of code blocks.

In some examples, the wireless device may perform a cyclic redundancy check (CRC) for the subband 305-*a*, the subband 305-*b*, or the subband 305-*c*. For example, the wireless device may perform a first CRC on the first subset of the plurality of code blocks corresponding to the subband 305-*a*, a second CRC on the second subset of the plurality of code blocks corresponding to the subband 305-*b*, and a third CRC on the third subset of code blocks of the plurality of code blocks corresponding to the subband 305-*c*. Additionally, or alternatively, the wireless device may refrain from performing a CRC for a transport block (e.g., on a transport block-basis). In some cases, the wireless device may perform joint processing based on refraining from performing the CRC for the transport block. Additionally, or alternatively, the wireless device may perform a transport block-based CRC for the plurality of code blocks. For example, a transport-block based CRC may appear in the subband 305-*c* (e.g., the last subband).

In some cases, the wireless device may schedule a transport block within each subband. For example, the wireless device may schedule a first transport block for the subband 305-*a*, a second transport block for the subband 305-*b*, and a third transport block for the subband 305-*c*. In some examples, the wireless device may transmit a grant scheduling a transmission across one or more subbands. The wireless device may perform the first CRC for the first transport block, the second CRC for the second transport block, and the third CRC for the third transport block.

The wireless device may transmit the first codeword to a second wireless device (e.g., a receiving device). In some examples, the second wireless device may process the first portion of the first codeword, the second portion of the first codeword, and the third portion of the first codeword. For example, the second wireless device may process the portions in a frequency-first, time-second manner. Additionally, or alternatively, the second wireless device may store one or more channel estimates associated with each subband. In some examples, the second wireless device may store one or more first channel estimates associated with the first subband. The second wireless device may store one or more second channel estimates associated with the second subband based on overwriting a portion of the one or more first channel estimates. That is, the second wireless device may reduce memory usage by storing a set of channel estimates associated with a subband at a time.

Figure 4:
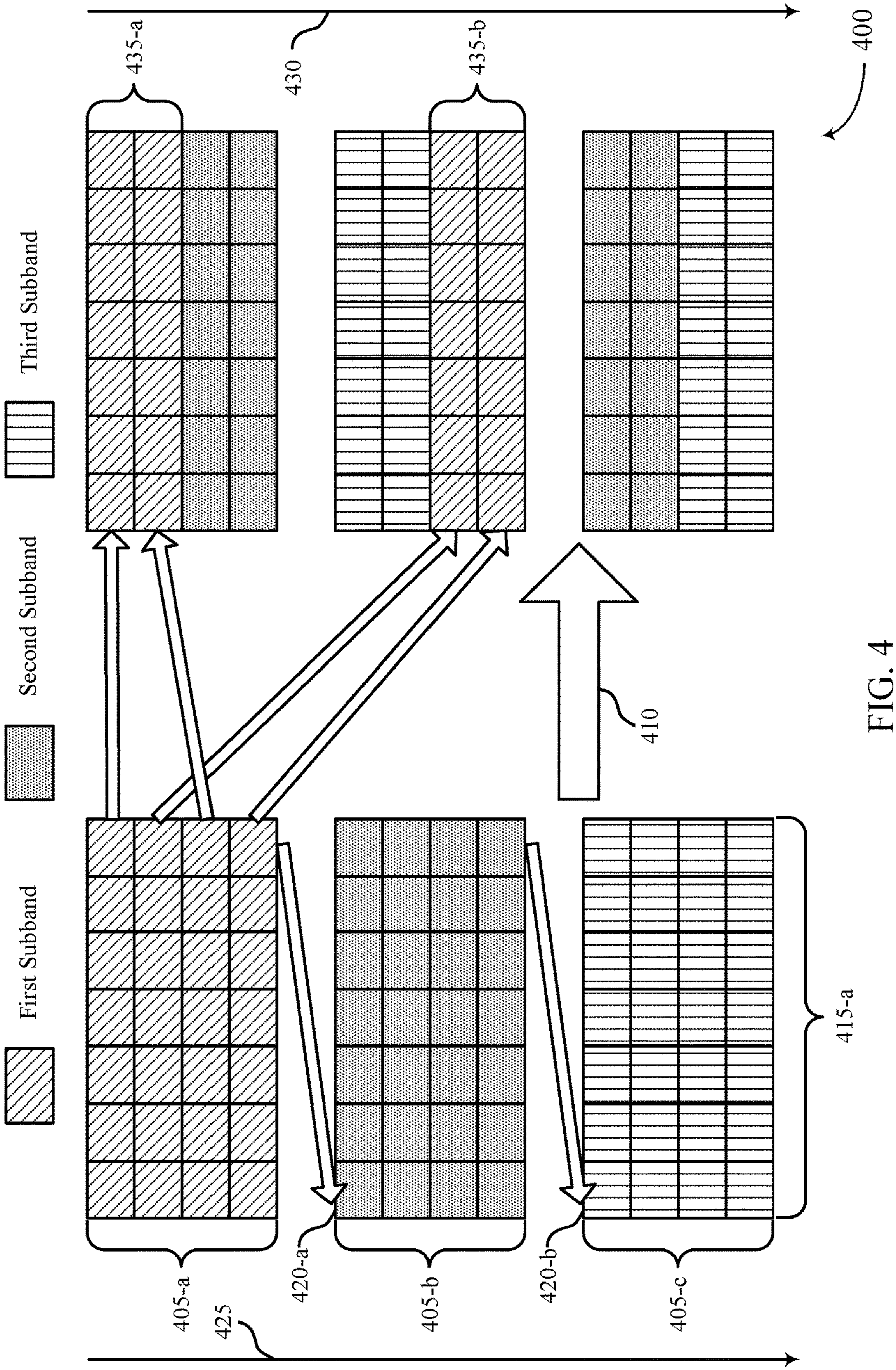
FIG. 4 shows an example of a resource element mapping diagram that supports time frequency resource mapping for wideband systems in accordance with one or more aspects of the present disclosure.

FIG. 4 shows an example of a resource element mapping diagram 400 that supports time frequency resource mapping for wideband systems in accordance with one or more aspects of the present disclosure.

The resource element mapping diagram 400 may implement or be implemented by aspects of the wireless communications system 100, the wireless communications system 200, or both. For example, the resource element mapping diagram 400 may be implemented by a network entity or a UE, which may represent examples of a network entity 105 and a UE 115, respectively, as described with reference to FIGS. 1 and 2.

A wireless device (e.g., a network entity, a UE, etc.) may map a first codeword to VRBs of a plurality of virtual subbands of a set of virtual time-frequency resources in a frequency-first, time-second manner. For example, the wireless device may map a first portion of the first codeword to a first set of virtual resource blocks of a virtual subband 405-*a,* where the mapping is first across a set of frequency resources (e.g., of the set of virtual time-frequency resources) associated with the virtual subband 405-*a* and then across virtual time resources 415-*a*. For example, the wireless device may map the first codeword starting in the frequency dimension of the virtual subband 405-*a* for a first time resource, and then in the frequency dimension for a second time resource, and so on. That is, the wireless device may map the first codeword to resource elements of the virtual subband 405-*a* in a frequency-first, time-second manner. The wireless device may map a second portion of the first codeword to a second set of virtual resource blocks of a virtual subband 405-*b,* a third portion of the first codeword to a third set of virtual resource blocks of a virtual subband 405-*c,* or both. In some examples, a virtual resource block index 425 may include a plurality of virtual subbands including the virtual subband 405-*a,* the virtual subband 405-*b,* and the virtual subband 405-*c*.

In some examples, each virtual subband may include one or more code blocks. For example, a codeword may include a plurality of code blocks and respective subsets of the plurality of code blocks may be mapped to each virtual subband (e.g., with each respective subset having an integer quantity of code blocks). That is, a starting resource element for a virtual subband (e.g., resource element 420-*a* or resource element 420-*b*) may correspond to the start of a code block of the one or more code blocks mapped to the virtual subband, and the one or more code blocks may terminate within the virtual subband (not be mapped across virtual subbands).

In some cases, the wireless device may perform VRB to PRB mapping 410 (e.g., interleaving). For example, the wireless device may perform VRB to PRB mapping 410 to distribute each code block over non-contiguous frequency resources. In some cases, a relatively large set of subbands with a relatively small subband size may be associated with frequency diversity loss. The VRB to PRB mapping 410 may increase the frequency diversity to compensate for relatively large sets of subbands with relatively small subband sizes.

The wireless device may perform the VRB to PRB mapping 410 such that a precoding resource block group or physical resource block group may correspond to a portion of a virtual subband. The precoding resource block group or the physical resource block group may include a set of PRBs. In some examples, the wireless device may use a same precoding matrix across PRBs of a precoding resource block group.

The wireless device may map the VRBs to physical resource block groups, such as a physical resource block group 435-*a,* a physical resource block group 435-*b,* or both, across a physical resource block index 430. In some examples, the physical resource block group 435-*a,* the physical resource block group 435-*b,* or both may include resource blocks of the first subband (e.g., the virtual subband 405-*a*). In some cases, one or more physical resource block groups may be associated with a same VRB group, however, a physical resource block group may not include VRBs of more than one virtual subband. For example, a physical resource block group may not include resource blocks of both the first virtual subband and either a second virtual subband or a third virtual subband.

In some examples, a second wireless device (e.g., a receiving device) may perform channel estimation within a virtual subband. For example, the second wireless device may perform first channel estimation for the first virtual subband corresponding to the physical resource block group 435-*a* and the physical resource block group 435-*b* and store one or more first channel estimates. The second wireless device may, then, perform second channel estimation for the second virtual subband corresponding to one or more second physical resource block groups and store one or more second channel estimates overwriting the one or more first channel estimates.

Additionally, or alternatively, the second wireless device (e.g., the receiving device) may perform channel estimation according to physical subbands. For example, the wireless device (e.g., the transmitting device) may limit VRB-PRB interleaving within a physical subband, or, to a threshold quantity of consecutive physical subbands (e.g., up to M consecutive physical subbands).

Figure 5:
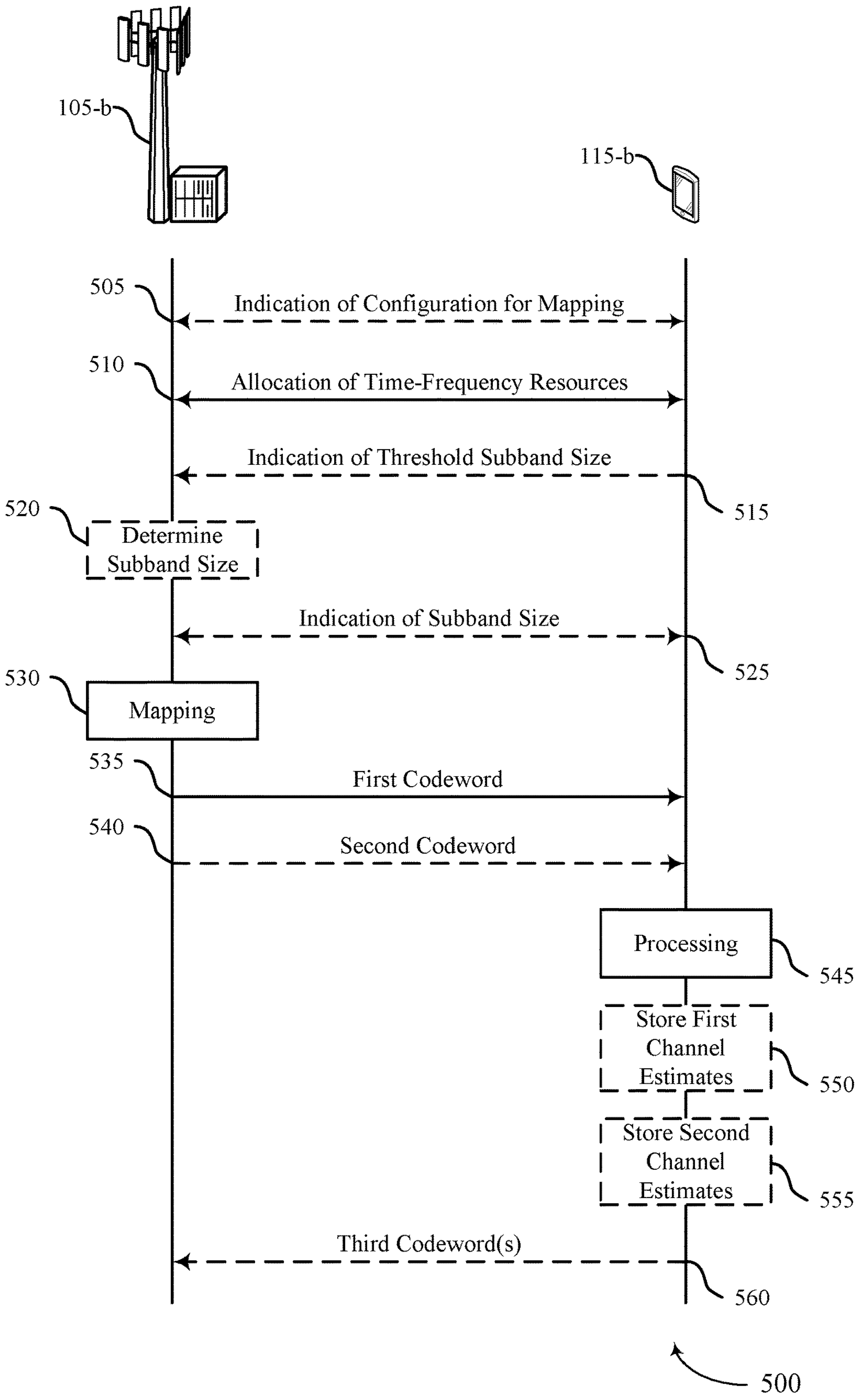
FIG. 5 shows an example of a process flow that supports time frequency resource mapping for wideband systems in accordance with one or more aspects of the present disclosure.

FIG. 5 shows an example of a process flow 500 that supports time frequency resource mapping for wideband systems in accordance with one or more aspects of the present disclosure. In some examples, the process flow 500 may implement or be implemented by aspects of the wireless communications system 100 or the wireless communications system 200 as described with reference to FIG. 1 or FIG. 2. For example, the process flow 500 may be implemented by a network entity 105-*b* and a UE 115-*b,* which may be examples of the network entity 105 and the UE 115 as described with reference to FIG. 1 and FIG. 2. The process flow 500 may also implement or be implemented by aspects of the resource element mapping diagram 300, the resource element mapping diagram 400, or both. Alternative examples of the following may be implemented, where some steps are performed in a different order than described or are not performed at all. In some cases, steps may include additional features not mentioned below, or further steps may be added.

At 505, the network entity 105-*b* and the UE 115-*b* may communicate an indication of a configuration for mapping. For example, the network entity 105-*b* may transmit an indication of a configuration for mapping a first codeword according to a set of subbands. In some examples, the set of subbands may include at least a first subband and a second subband. In some cases, the network entity 105-*b* may transmit the indication via a radio resource control (RRC) message, a downlink control information (DCI) message, or a medium access control-control element (MAC-CE) message.

In some examples, the indication of the configuration for mapping may include a first configuration for mapping a first waveform type (e.g., CP-OFDM) and a second configuration for mapping a second waveform type (e.g., discrete Fourier transform-spread OFDM (DFT-S-OFDM)). For example, the network entity 105-*b* may configure mapping for different waveform types separately.

Additionally, or alternatively, the indication of the configuration for mapping may include a first configuration for mapping a first transmission direction (e.g., uplink) and a second configuration for mapping a second transmission direction (e.g., downlink, sidelink, etc.). For example, the network entity 105-*b* may configure mapping for uplink and downlink transmissions separately.

In some examples, the indication of the configuration for mapping may configure mapping to occur based on a quantity of layers exceeding a threshold quantity of layers, a transmission bandwidth exceeding a threshold transmission bandwidth, or both. For example, the indication of the configuration for mapping may configure mapping to occur based on the quantity of layers, the transmission bandwidth, or both associated with the transmission. For example, the network entity 105-*b*, the UE 115-*b*, or both may perform subband-based mapping (e.g., in a frequency-first, time-second manner) based on the quantity of layers exceeding the threshold quantity of layers, the transmission bandwidth exceeding the threshold transmission bandwidth, or both. Or, the network entity 105-*b*, the UE 115-*b*, or both may perform mapping (e.g., without consideration of subbands) in the frequency-first, time-second manner based on the quantity of layers being below the threshold quantity of layers, the transmission bandwidth being below the threshold transmission bandwidth, or both.

At 510, the network entity 105-*b* and the UE 115-*b* may communicate an allocation of time-frequency resources. For example, the network entity 105-*b* may determine an allocation of a set of time-frequency resources of a carrier for transmission of the first codeword.

In some examples, the first codeword may include a set of code blocks. For example, the first portion of the first codeword may include a first subset of the set of code blocks, and the second portion of the first codeword may include a second subset of the set of code blocks. The first subset and the second subset may be disjoint subsets.

Additionally, or alternatively, a first code block of the second subset of the plurality of code blocks may begin on a first resource element of the second subband. For example, each subband may include one or more code blocks of the set of code blocks such that each code block may not cross subband boundaries.

In some examples, communicating the allocation may include communicating one or more parameters including a quantity of layers, a transmission bandwidth, or both.

At 515, the UE 115-*b* may transmit an indication of a threshold subband size to the network entity 105-*b*. For example, the network entity 105-*b* may receive, from the UE 115-*b*, the indication of the threshold subband size where a size of the first subband, the second subband, or both may be based on the indication. In some examples, the indication may include a capability associated with a component carrier size or a quantity of layers. For example, the threshold subband size may be based on the capability associated with the component carrier size or the quantity of layers. In some examples, the threshold subband size may be associated with a combination of the component carrier size and the quantity of layers. For example, the UE 115-*b* may transmit an indication of a combination of the component carrier size and the quantity of layers. Additionally, or alternatively, the UE 115-*b* may transmit an indication of a combination of the threshold subband size and the quantity of layers. In some examples, the UE 115-*b* may transmit an indication of the threshold subband size, the component carrier size, and the quantity of layers. Additionally, or alternatively, the component carrier size may be based on a subcarrier spacing (SCS). For example, a quantity of samples stored per slot may be determined based on the SCS.

At 520, the network entity 105-*b* may determine a subband size. For example, the network entity 105-*b* may determine the subband size associated with the first subband, the second subband, or both based on one or more parameters associated with the transmission. For example, the one or more parameters may include one or more layers, one or more symbols (e.g., OFDM symbols), a scheduled bandwidth, or the like.

At 525, the network entity 105-*b* and the UE 115-*b* may communicate an indication of a subband size. For example, the network entity 105-*b* may transmit (e.g., explicitly signal) an indication of a subband size associated with the first subband, the second subband, or both to the UE 115-*b*. In some examples, the indication of the subband size may be communicated via a RRC message, a DCI message, a UCI message, or a MAC-CE message. For example, the UE 115-*b* may transmit the indication of the subband size via a UCI message.

At 530, the network entity 105-*b* may perform mapping. For example, the network entity 105-*b* may map a first portion of the first codeword to resource elements of a first subband of the set of time-frequency resources in a frequency-first, time-second manner. The network entity 105-*b* may map a second portion of the first codeword to resource elements of a second subband of the set of time-frequency resources in a frequency-first, time-second manner. The first portion of the first codeword may include a contiguous portion of the first codeword that precedes the second portion of the first codeword.

In some examples, the network entity 105-*b* may map the first codeword according to the first subband and the second subband based on identifying a waveform type associated with transmitting the first codeword. For example, the network entity 105-*b* may map the first codeword according to the indication of the configuration for mapping received at 505 where the mapping is configured based on a waveform type.

In some examples, the network entity 105-*b* may map the first codeword according to the first subband and the second subband based on the one or more parameters. For example, the network entity 105-*b* may map the first codeword based on the one or more parameters communicated at 510. In some examples, the one or more parameters may include a quantity of layers, a transmission bandwidth, or both. For example, the network entity 105-*b* may map the first codeword based on the quantity of layers exceeding the threshold quantity of layers, the transmission bandwidth exceeding a threshold transmission bandwidth, or both. For example, the network entity 105-*b* may map the first codeword according to the indication of the configuration for mapping received at 505 where mapping is configured based on the threshold quantity of layers, the threshold transmission bandwidth, or both.

Additionally, or alternatively, the network entity 105-*b* may map, for each of a set of physical resource block groups of a set of physical resources, respective sets of virtual resource blocks to corresponding physical resource block groups. For example, each virtual subband of a set of virtual subbands of the set of time-frequency resources may be associated with a respective set of virtual resources including a set of virtual resource blocks. That is, each virtual subband may include a set of virtual resources. The set of virtual subbands may include at least the first subband and the second subband.

At 535, the network entity 105-*b* may transmit a first codeword to the UE 115-*b*. For example, the network entity 105-*b* may transmit the first codeword to the UE 115-*b* within the set of time-frequency resources based on the mapping at 530.

In some examples, the network entity 105-*b* may transmit the first codeword via one or more first spatial layers. For example, the network entity 105-*b* may map the first codeword to resource elements of the one or more first spatial layers (e.g., MIMO layers) in the frequency-first, time-second manner. Additionally, or alternatively, the network entity 105-*b* may map the first portion of the first codeword to the resource elements of the first subband in the frequency-first, time-second manner and the second portion of the first codeword to the resource elements of the second subband in the frequency-first, time-second manner based on mapping the first codeword to the resource elements of the one or more first spatial layers.

At 540, the network entity 105-*b* may transmit a second codeword to the UE 115-*b*. For example, the network entity 105-*b* may transmit the second codeword via one or more second spatial layers, where the one or more second spatial layers and the one or more first spatial layers are different. The network entity 105-*b* may transmit the first codeword and the second codeword concurrently via the time-frequency resources communicated at 510.

At 545, the UE 115-*b* may perform processing. For example, the UE 115-*b* may process the first portion of the first codeword from resource elements of the first subband of the set of time-frequency resources in a frequency-first, time-second manner. Additionally, or alternatively, the UE 115-*b* may process the second portion of the first codeword from resource elements of the second subband of the set of time-frequency resources in the frequency-first, time-second manner.

At 550, the UE 115-*b* may store one or more first channel estimates. For example, the UE 115-*b* may store one or more first channel estimates associated with the first subband based on the processing at 550.

At 555, the UE 115-*b* may store one or more second channel estimates. For example, the UE 115-*b* may store one or more second channel estimates associated with the second subband based on the processing at 550. In some examples, storing the one or more second channel estimates may include overwriting at least a portion of the stored one or more first channel estimates. For example, the UE 115-*b* may process and subsequently store the one or more first channel estimates and process and subsequently store the one or more second channel estimates where the one or more first channel estimates and the one or more second channel estimates may not be stored simultaneously.

At 560, the UE 115-*b* may transmit one or more third codewords to the network entity 105-*b*. For example, the network entity 105-*b* may receive one or more third codewords via a second set of time-frequency resources, where a first portion of the one or more third codewords may be mapped across frequency resources of a first time resource of the second set of time-frequency resources prior to mapping of a second portion of the one or more second codewords across the frequency resources of a second time resource of the second set of time-frequency resources. In some examples, the UE 115-*b* may map the one or more third codewords based on the indication of the configuration for mapping communicated at 505. For example, the UE 115-*b* may map the one or more third codewords according to a first mapping type different from a second mapping type used by the network entity 105-*a* to map the first codeword.

Figure 6:
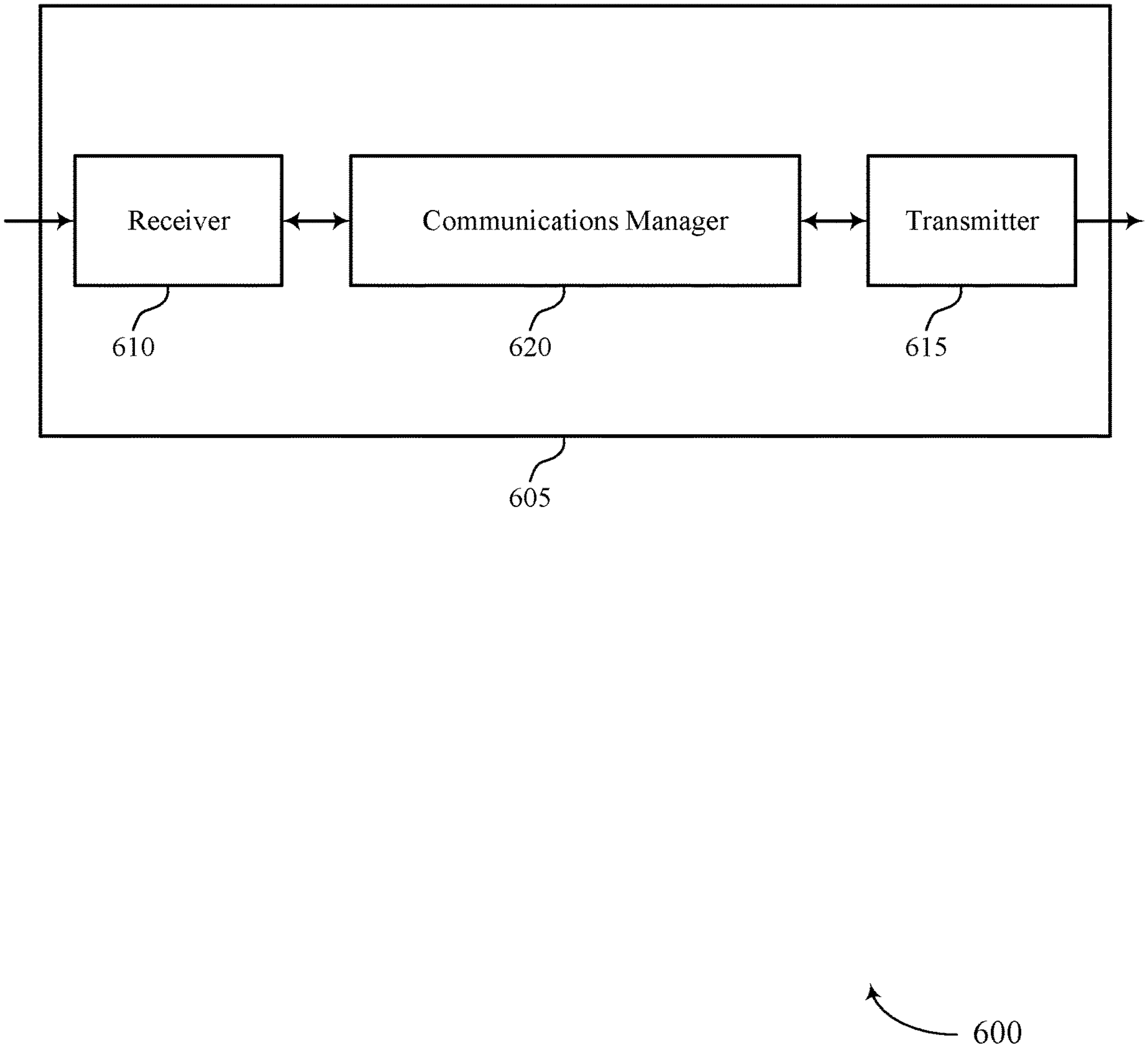
FIGS. 6 and 7 show block diagrams of devices that support time frequency resource mapping for wideband systems in accordance with one or more aspects of the present disclosure.

FIG. 6 shows a block diagram 600 of a device 605 that supports time frequency resource mapping for wideband systems in accordance with one or more aspects of the present disclosure. The device 605 may be an example of aspects of a network entity 105 as described herein. The device 605 may include a receiver 610, a transmitter 615, and a communications manager 620. The device 605, or one or more components of the device 605 (e.g., the receiver 610, the transmitter 615, and the communications manager 620), may include one or more processors, and instructions stored in the memory that are executable by the one or more processors to enable the one or more processors to perform time frequency resource mapping for wideband systems discussed herein. Each of these components may be in communication with one another (e.g., via one or more buses).

The receiver 610 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 605. In some examples, the receiver 610 may support obtaining information by receiving signals via one or more antennas. Additionally, or alternatively, the receiver 610 may support obtaining information by receiving signals via one or more wired (e.g., electrical, fiber optic) interfaces, wireless interfaces, or any combination thereof.

The transmitter 615 may provide a means for outputting (e.g., transmitting, providing, conveying, sending) information generated by other components of the device 605. For example, the transmitter 615 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 615 may support outputting information by transmitting signals via one or more antennas. Additionally, or alternatively, the transmitter 615 may support outputting information by transmitting signals via one or more wired (e.g., electrical, fiber optic) interfaces, wireless interfaces, or any combination thereof. In some examples, the transmitter 615 and the receiver 610 may be co-located in a transceiver, which may include or be coupled with a modem.

The communications manager 620, the receiver 610, the transmitter 615, or various combinations thereof or various components thereof may be examples of means for performing various aspects of time frequency resource mapping for wideband systems as described herein. For example, the communications manager 620, the receiver 610, the transmitter 615, or various combinations or components thereof may be capable of performing one or more of the functions described herein.

In some examples, the communications manager 620, the receiver 610, the transmitter 615, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 620, the receiver 610, the transmitter 615, or various combinations or components thereof may be implemented in code (e.g., as communications management software or firmware) executed by at least one processor. If implemented in code executed by at least one processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications in accordance with examples as disclosed herein. For example, the communications manager 620 is capable of, configured to, or operable to support a means for communicating an allocation of a set of time-frequency resources of a carrier for transmission of a first codeword. The communications manager 620 is capable of, configured to, or operable to support a means for mapping, a first portion of the first codeword to resourcing elements of a first subband of the set of time-frequency resources in a frequency-first, time-second manner and a second portion of the first codeword to resource elements of a second subband of the set of time-frequency resources in the frequency-first, time-second manner, where the first portion of the first codeword includes a contiguous portion of the first codeword that precedes the second portion of the first codeword. The communications manager 620 is capable of, configured to, or operable to support a means for transmitting, within the set of time-frequency resources, the first codeword based on the mapping.

By including or configuring the communications manager 620 in accordance with examples as described herein, the device 605 (e.g., at least one processor controlling or otherwise coupled with the receiver 610, the transmitter 615, the communications manager 620, or a combination thereof) may support techniques for reduced processing, reduced power consumption, and more efficient utilization of communication resources.

Figure 7:
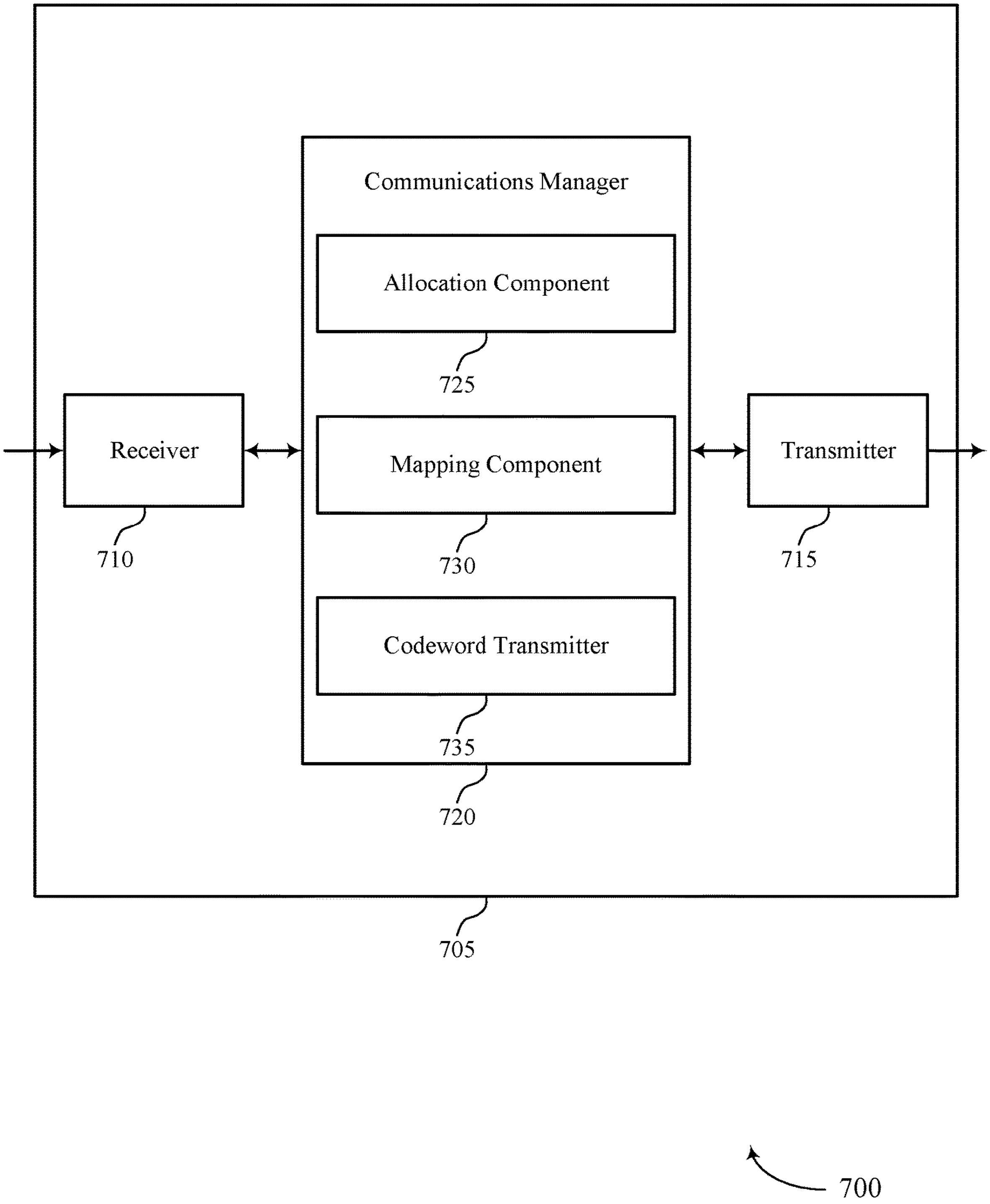

FIG. 7 shows a block diagram 700 of a device 705 that supports time frequency resource mapping for wideband systems in accordance with one or more aspects of the present disclosure. The device 705 may be an example of aspects of a device 605 or a network entity 105 as described herein. The device 705 may include a receiver 710, a transmitter 715, and a communications manager 720. The device 705, or one or more components of the device 705 (e.g., the receiver 710, the transmitter 715, and the communications manager 720), may include at least one processor, which may be coupled with at least one memory, to support the described techniques. Each of these components may be in communication with one another (e.g., via one or more buses).

The receiver 710 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 705. In some examples, the receiver 710 may support obtaining information by receiving signals via one or more antennas. Additionally, or alternatively, the receiver 710 may support obtaining information by receiving signals via one or more wired (e.g., electrical, fiber optic) interfaces, wireless interfaces, or any combination thereof.

The transmitter 715 may provide a means for outputting (e.g., transmitting, providing, conveying, sending) information generated by other components of the device 705. For example, the transmitter 715 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 715 may support outputting information by transmitting signals via one or more antennas. Additionally, or alternatively, the transmitter 715 may support outputting information by transmitting signals via one or more wired (e.g., electrical, fiber optic) interfaces, wireless interfaces, or any combination thereof. In some examples, the transmitter 715 and the receiver 710 may be co-located in a transceiver, which may include or be coupled with a modem.

The device 705, or various components thereof, may be an example of means for performing various aspects of time frequency resource mapping for wideband systems as described herein. For example, the communications manager 720 may include an allocation component 725, a mapping component 730, a codeword transmitter 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications in accordance with examples as disclosed herein. The allocation component 725 is capable of, configured to, or operable to support a means for communicating an allocation of a set of time-frequency resources of a carrier for transmission of a first codeword. The mapping component 730 is capable of, configured to, or operable to support a means for mapping, a first portion of the first codeword to resource elements of a first subband of the set of time-frequency resources in a frequency-first, time-second manner and a second portion of the first codeword to resource elements of a second subband of the set of time-frequency resources in the frequency-first, time-second manner, where the first portion of the first codeword includes a contiguous portion of the first codeword that precedes the second portion of the first codeword. The codeword transmitter 735 is capable of, configured to, or operable to support a means for transmitting, within the set of time-frequency resources, the first codeword based on the mapping.

In some cases, the allocation component 725, the mapping component 730, or the codeword transmitter 735 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the allocation component 725, the mapping component 730, or the codeword transmitter 735 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 8:
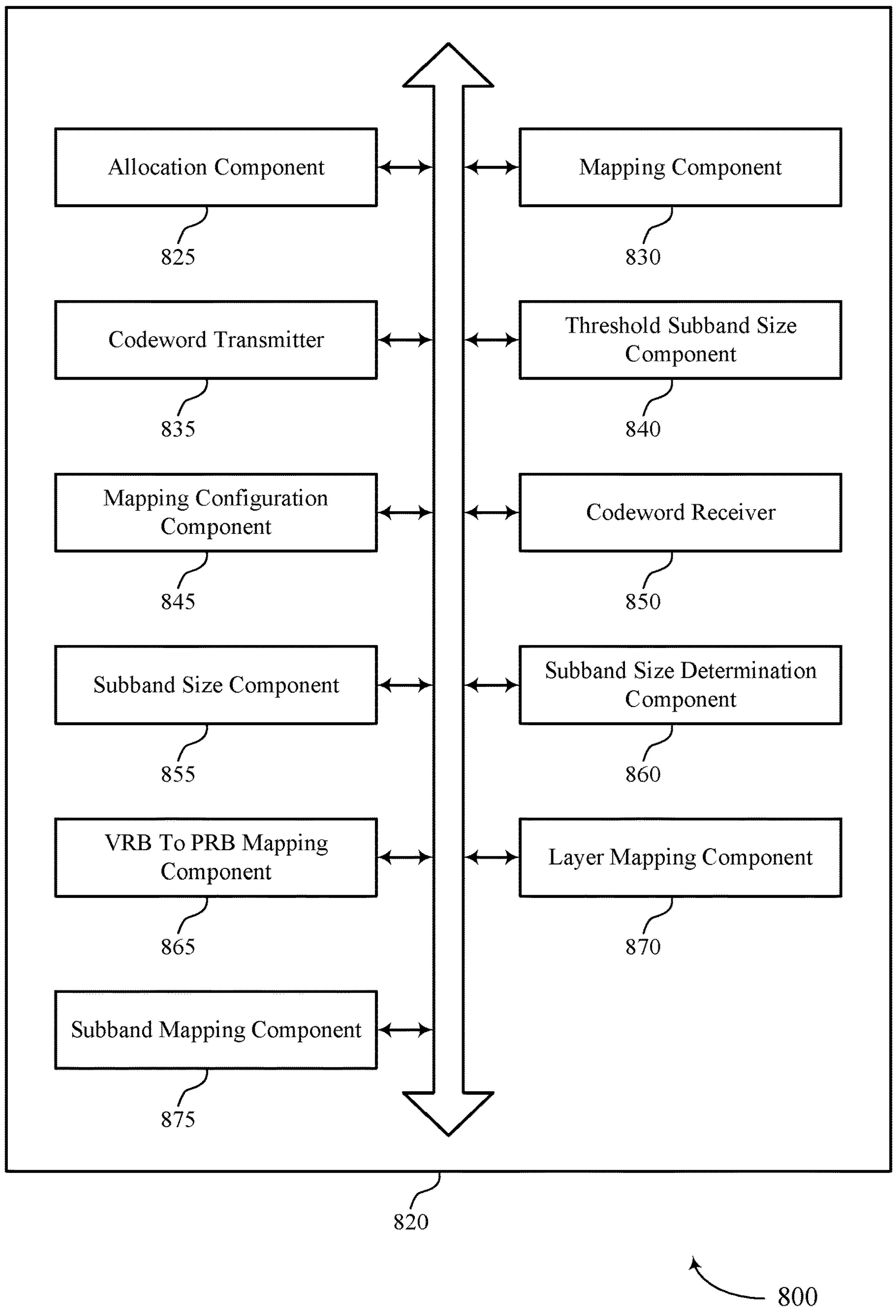
FIG. 8 shows a block diagram of a communications manager that supports time frequency resource mapping for wideband systems in accordance with one or more aspects of the present disclosure.

FIG. 8 shows a block diagram 800 of a communications manager 820 that supports time frequency resource mapping for wideband systems in accordance with one or more aspects of the present disclosure. The communications manager 820 may be an example of aspects of a communications manager 620, a communications manager 720, or both, as described herein. The communications manager 820, or various components thereof, may be an example of means for performing various aspects of time frequency resource mapping for wideband systems as described herein. For example, the communications manager 820 may include an allocation component 825, a mapping component 830, a codeword transmitter 835, a threshold subband size component 840, a mapping configuration component 845, a codeword receiver 850, a subband size component 855, a subband size determination component 860, an VRB to PRB mapping component 865, a layer mapping component 870, a subband mapping component 875, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 820 may support wireless communications in accordance with examples as disclosed herein. The allocation component 825 is capable of, configured to, or operable to support a means for communicating an allocation of a set of time-frequency resources of a carrier for transmission of a first codeword. The mapping component 830 is capable of, configured to, or operable to support a means for mapping, a first portion of the first codeword to resource elements of a first subband of the set of time-frequency resources in a frequency-first, time-second manner and a second portion of the first codeword to resource elements of a second subband of the set of time-frequency resources in the frequency-first, time-second manner, where the first portion of the first codeword includes a contiguous portion of the first codeword that precedes the second portion of the first codeword. The codeword transmitter 835 is capable of, configured to, or operable to support a means for transmitting, within the set of time-frequency resources, the first codeword based on the mapping.

In some examples, the first codeword includes a set of multiple code blocks, and where of the first portion of the first codeword includes a first subset of the set of multiple code blocks and the second portion of the first codeword includes a second subset of the set of multiple code blocks, and where the first subset and the second subset of the set of multiple code blocks are disjoint subsets.

In some examples, a first code block of the second subset of the set of multiple code blocks begins on a first resource element of the second subband.

In some examples, the threshold subband size component 840 is capable of, configured to, or operable to support a means for receiving, from a second wireless device, an indication of a threshold subband size, where a size of the first subband, the second subband, or both are based on the indication.

In some examples, the indication includes a capability associated with a component carrier size or a quantity of layers.

In some examples, the mapping configuration component 845 is capable of, configured to, or operable to support a means for communicating an indication of a configuration for mapping the first codeword according to a set of subbands, the set of subbands including the first subband and the second subband.

In some examples, the codeword receiver 850 is capable of, configured to, or operable to support a means for receiving one or more second codewords via a second set of time-frequency resources, where a first portion of the one or more second codewords is mapped across frequency resources of a first time resource of the second set of time-frequency resources prior to mapping of a second portion of the one or more second codewords across the frequency resources of a second time resource of the second set of time-frequency resources.

In some examples, mapping the first codeword according to the first subband and the second subband is based on identifying a waveform type associated with transmitting the first codeword.

In some examples, communicating the allocation includes communicating one or more parameters, where mapping the first codeword according to the first subband and the second subband is based on the one or more parameters.

In some examples, the one or more parameters include a quantity of layers, where mapping the first codeword according to the first subband and the second subband is based on the quantity of layers exceeding a threshold quantity of layers.

In some examples, the one or more parameters include a transmission bandwidth, where mapping the first codeword according to the first subband and the second subband is based on the transmission bandwidth exceeding a threshold transmission bandwidth.

In some examples, the subband size component 855 is capable of, configured to, or operable to support a means for communicating an indication of a subband size associated with the first subband, the second subband, or both.

In some examples, the indication of the subband size is communicated via an RRC message, a DCI message, a UCI message, or a MAC-CE message.

In some examples, the subband size determination component 860 is capable of, configured to, or operable to support a means for determining a subband size associated with the first subband, the second subband, or both based on one or more parameters associated with the transmission.

In some examples, one or more parameters include one or more layers, one or more symbols, a scheduled bandwidth, or a combination thereof.

In some examples, to support, for each of a set of multiple physical resource block groups of a set of physical resources, the mapping, the VRB to PRB mapping component 865 is capable of, configured to, or operable to support a means for mapping respective sets of virtual resource blocks to each physical resource block group, where the respective sets of virtual resource blocks mapped to each of the physical resource block groups are from a same subband of the set of multiple subbands or one or more consecutive subbands of the set of multiple subbands.

In some examples, transmitting the first codeword includes transmitting the first codeword via one or more first spatial layers.

In some examples, to support mapping the first codeword, the layer mapping component 870 is capable of, configured to, or operable to support a means for mapping the first codeword to resource elements of the one or more first spatial layers. In some examples, to support mapping the first codeword, the subband mapping component 875 is capable of, configured to, or operable to support a means for mapping, based on mapping the first codeword to the resource elements of the one or more first spatial layers, the first portion of the first codeword to the resource elements of the first subband and the second portion of the first codeword to the resource elements of the second subband.

In some examples, the codeword transmitter 835 is capable of, configured to, or operable to support a means for transmitting a second codeword via one or more second spatial layers, where the one or more second spatial layers and the one or more first spatial layers are different.

In some cases, the allocation component 825, the mapping component 830, the codeword transmitter 835, the threshold subband size component 840, the mapping configuration component 845, the codeword receiver 850, the subband size component 855, the subband size determination component 860, the VRB to PRB mapping component 865, the layer mapping component 870, and the subband mapping component 875 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the allocation component 825, the mapping component 830, the codeword transmitter 835, the threshold subband size component 840, the mapping configuration component 845, the codeword receiver 850, the subband size component 855, the subband size determination component 860, the VRB to PRB mapping component 865, the layer mapping component 870, and the subband mapping component 875 discussed herein.

Figure 9:
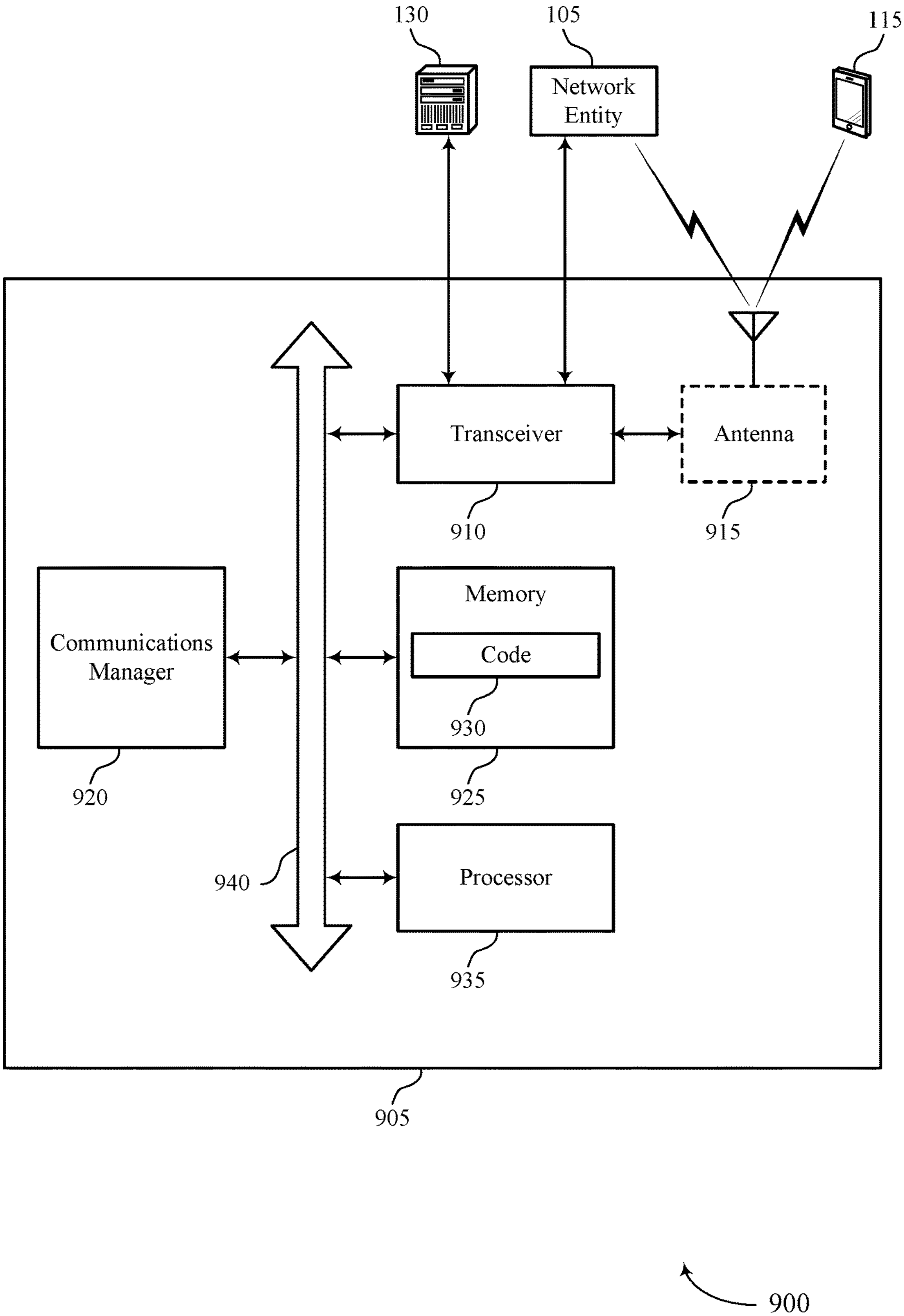
FIG. 9 shows a diagram of a system including a device that supports time frequency resource mapping for wideband systems in accordance with one or more aspects of the present disclosure.

FIG. 9 shows a diagram of a system 900 including a device 905 that supports time frequency resource mapping for wideband systems in accordance with one or more aspects of the present disclosure. The device 905 may be an example of or include the components of a device 605, a device 705, or a network entity 105 as described herein. The device 905 may communicate with one or more network entities 105, one or more UEs 115, or any combination thereof, which may include communications over one or more wired interfaces, over one or more wireless interfaces, or any combination thereof. The device 905 may include components that support outputting and obtaining communications, such as a communications manager 920, a transceiver 910, an antenna 915, at least one memory 925, code 930, and at least one processor 935. These components may be in electronic communication or otherwise coupled (e.g., operatively, communicatively, functionally, electronically, electrically) via one or more buses (e.g., a bus 940).

The transceiver 910 may support bi-directional communications via wired links, wireless links, or both as described herein. In some examples, the transceiver 910 may include a wired transceiver and may communicate bi-directionally with another wired transceiver. Additionally, or alternatively, in some examples, the transceiver 910 may include a wireless transceiver and may communicate bi-directionally with another wireless transceiver. In some examples, the device 905 may include one or more antennas 915, which may be capable of transmitting or receiving wireless transmissions (e.g., concurrently). The transceiver 910 may also include a modem to modulate signals, to provide the modulated signals for transmission (e.g., by one or more antennas 915, by a wired transmitter), to receive modulated signals (e.g., from one or more antennas 915, from a wired receiver), and to demodulate signals. In some implementations, the transceiver 910 may include one or more interfaces, such as one or more interfaces coupled with the one or more antennas 915 that are configured to support various receiving or obtaining operations, or one or more interfaces coupled with the one or more antennas 915 that are configured to support various transmitting or outputting operations, or a combination thereof. In some implementations, the transceiver 910 may include or be configured for coupling with one or more processors or one or more memory components that are operable to perform or support operations based on received or obtained information or signals, or to generate information or other signals for transmission or other outputting, or any combination thereof. In some implementations, the transceiver 910, or the transceiver 910 and the one or more antennas 915, or the transceiver 910 and the one or more antennas 915 and one or more processors or one or more memory components (e.g., the at least one processor 935, the at least one memory 925, or both), may be included in a chip or chip assembly that is installed in the device 905. In some examples, the transceiver 910 may be operable to support communications via one or more communications links (e.g., a communication link 125, a backhaul communication link 120, a midhaul communication link 162, a fronthaul communication link 168).

The at least one memory 925 may include RAM, ROM, or any combination thereof. The at least one memory 925 may store computer-readable, computer-executable code 930 including instructions that, when executed by one or more of the at least one processor 935, cause the device 905 to perform various functions described herein. The code 930 may be stored in a non-transitory computer-readable medium such as system memory or another type of memory. In some cases, the code 930 may not be directly executable by a processor of the at least one processor 935 but may cause a computer (e.g., when compiled and executed) to perform functions described herein. In some cases, the at least one memory 925 may contain, among other things, a BIOS which may control basic hardware or software operation such as the interaction with peripheral components or devices. In some examples, the at least one processor 935 may include multiple processors and the at least one memory 925 may include multiple memories. One or more of the multiple processors may be coupled with one or more of the multiple memories which may, individually or collectively, be configured to perform various functions herein (for example, as part of a processing system).

The at least one processor 935 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 935 may be configured to operate a memory array using a memory controller. In some other cases, a memory controller may be integrated into one or more of the at least one processor 935. The at least one processor 935 may be configured to execute computer-readable instructions stored in a memory (e.g., one or more of the at least one memory 925) to cause the device 905 to perform various functions (e.g., functions or tasks supporting time frequency resource mapping for wideband systems). For example, the device 905 or a component of the device 905 may include at least one processor 935 and at least one memory 925 coupled with one or more of the at least one processor 935, the at least one processor 935 and the at least one memory 925 configured to perform various functions described herein. The at least one processor 935 may be an example of a cloud-computing platform (e.g., one or more physical nodes and supporting software such as operating systems, virtual machines, or container instances) that may host the functions (e.g., by executing code 930) to perform the functions of the device 905. The at least one processor 935 may be any one or more suitable processors capable of executing scripts or instructions of one or more software programs stored in the device 905 (such as within one or more of the at least one memory 925). In some examples, the at least one processor 935 may include multiple processors and the at least one memory 925 may include multiple memories. One or more of the multiple processors may be coupled with one or more of the multiple memories, which may, individually or collectively, be configured to perform various functions herein. In some examples, the at least one processor 935 may be a component of a processing system, which may refer to a system (such as a series) of machines, circuitry (including, for example, one or both of processor circuitry (which may include the at least one processor 935) and memory circuitry (which may include the at least one memory 925)), or components, that receives or obtains inputs and processes the inputs to produce, generate, or obtain a set of outputs. The processing system may be configured to perform one or more of the functions described herein. As such, the at least one processor 935 or a processing system including the at least one processor 935 may be configured to, configurable to, or operable to cause the device 905 to perform one or more of the functions described herein. Further, as described herein, being "configured to," being "configurable to," and being "operable to" may be used interchangeably and may be associated with a capability, when executing code stored in the at least one memory 925 or otherwise, to perform one or more of the functions described herein.

In some examples, a bus 940 may support communications of (e.g., within) a protocol layer of a protocol stack. In some examples, a bus 940 may support communications associated with a logical channel of a protocol stack (e.g., between protocol layers of a protocol stack), which may include communications performed within a component of the device 905, or between different components of the device 905 that may be co-located or located in different locations (e.g., where the device 905 may refer to a system in which one or more of the communications manager 920, the transceiver 910, the at least one memory 925, the code 930, and the at least one processor 935 may be located in one of the different components or divided between different components).

In some examples, the communications manager 920 may manage aspects of communications with a core network 130 (e.g., via one or more wired or wireless backhaul links). For example, the communications manager 920 may manage the transfer of data communications for client devices, such as one or more UEs 115. In some examples, the communications manager 920 may manage communications with other network entities 105, and may include a controller or scheduler for controlling communications with UEs 115 in cooperation with other network entities 105. In some examples, the communications manager 920 may support an X2 interface within an LTE/LTE-A wireless communications network technology to provide communication between network entities 105.

The communications manager 920 may support wireless communications in accordance with examples as disclosed herein. For example, the communications manager 920 is capable of, configured to, or operable to support a means for communicating an allocation of a set of time-frequency resources of a carrier for transmission of a first codeword. The communications manager 920 is capable of, configured to, or operable to support a means for mapping, a first portion of the first codeword to resourcing elements of a first subband of the set of time-frequency resources in a frequency-first, time-second manner and a second portion of the first codeword to resource elements of a second subband of the set of time-frequency resources in the frequency-first, time-second manner, where the first portion of the first codeword includes a contiguous portion of the first codeword that precedes the second portion of the first codeword. The communications manager 920 is capable of, configured to, or operable to support a means for transmitting, within the set of time-frequency resources, the first codeword based on the mapping.

By including or configuring the communications manager 920 in accordance with examples as described herein, the device 905 may support techniques for reduced latency, improved user experience related to reduced processing, reduced power consumption, more efficient utilization of communication resources, improved coordination between devices, longer battery life, and improved utilization of processing capability.

In some examples, the communications manager 920 may be configured to perform various operations (e.g., receiving, obtaining, monitoring, outputting, transmitting) using or otherwise in cooperation with the transceiver 910, the one or more antennas 915 (e.g., where applicable), or any combination thereof. Although the communications manager 920 is illustrated as a separate component, in some examples, one or more functions described with reference to the communications manager 920 may be supported by or performed by the transceiver 910, one or more of the at least one processor 935, one or more of the at least one memory 925, the code 930, or any combination thereof (for example, by a processing system including at least a portion of the at least one processor 935, the at least one memory 925, the code 930, or any combination thereof). For example, the code 930 may include instructions executable by one or more of the at least one processor 935 to cause the device 905 to perform various aspects of time frequency resource mapping for wideband systems as described herein, or the at least one processor 935 and the at least one memory 925 may be otherwise configured to, individually or collectively, perform or support such operations.

Figure 10:
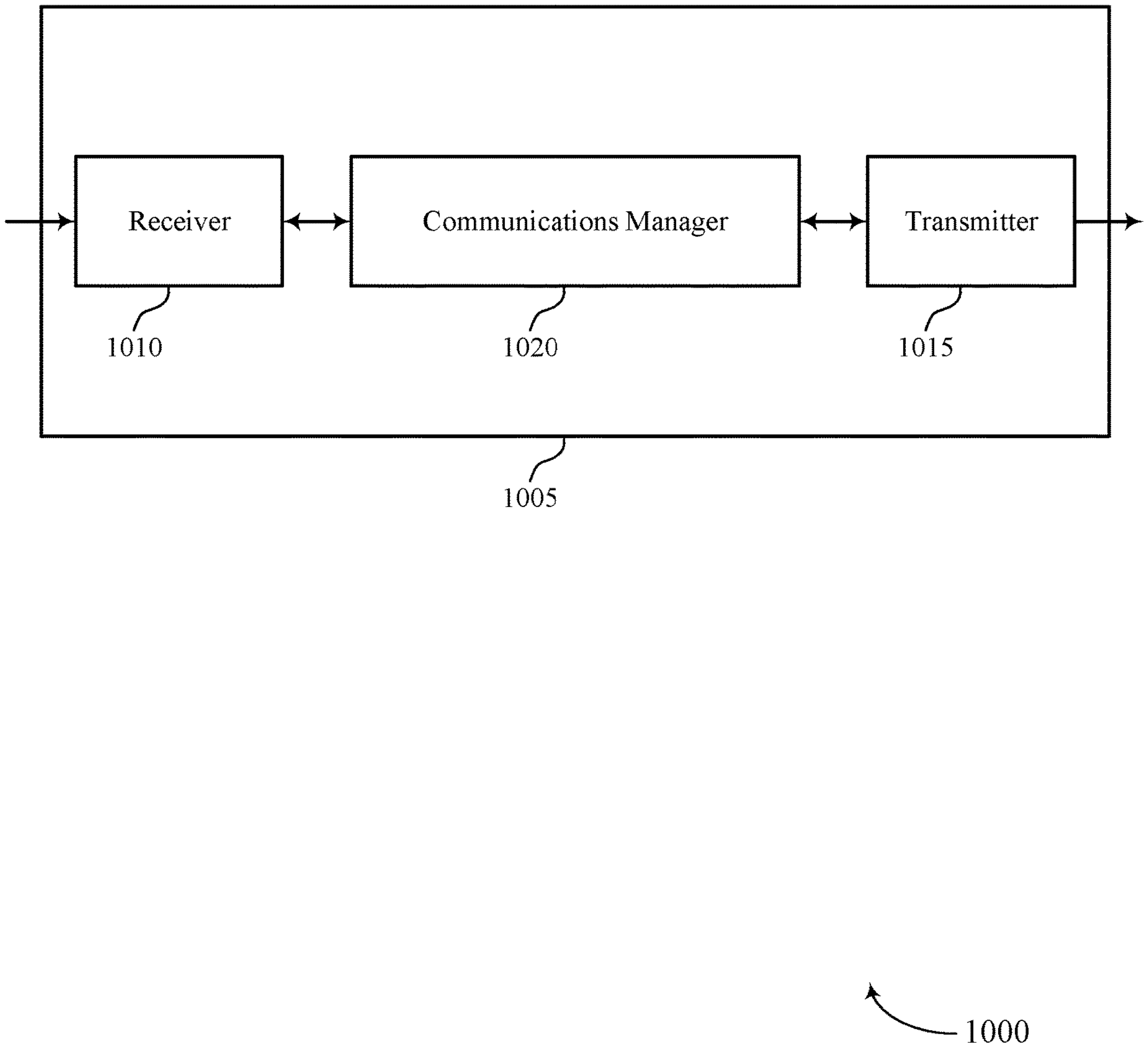
FIGS. 10 and 11 show block diagrams of devices that support time frequency resource mapping for wideband systems in accordance with one or more aspects of the present disclosure.

FIG. 10 shows a block diagram 1000 of a device 1005 that supports time frequency resource mapping for wideband systems in accordance with one or more aspects of the present disclosure. The device 1005 may be an example of aspects of a UE 115 as described herein. The device 1005 may include a receiver 1010, a transmitter 1015, and a communications manager 1020. The device 1005, or one or more components of the device 1005 (e.g., the receiver 1010, the transmitter 1015, and the communications manager 1020), may include at least one processor, which may be coupled with at least one memory, to, individually or collectively, support or enable the described techniques. Each of these components may be in communication with one another (e.g., via one or more buses).

The receiver 1010 may provide a means for receiving information such as packets, user data, control information, or any combination thereof associated with various information channels (e.g., control channels, data channels, information channels related to time frequency resource mapping for wideband systems). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to time frequency resource mapping for wideband systems). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of time frequency resource mapping for wideband systems as described herein. For example, the communications manager 1020, the receiver 1010, the transmitter 1015, or various combinations or components thereof may be capable of performing one or more of the functions described herein.

In some examples, the communications manager 1020, the receiver 1010, the transmitter 1015, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1020, the receiver 1010, the transmitter 1015, or various combinations or components thereof may be implemented in code (e.g., as communications management software or firmware) executed by at least one processor. If implemented in code executed by at least one processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications in accordance with examples as disclosed herein. For example, the communications manager 1020 is capable of, configured to, or operable to support a means for communicating an allocation of a set of time-frequency resources of a carrier for transmission of a first codeword. The communications manager 1020 is capable of, configured to, or operable to support a means for receiving, within the set of time-frequency resources, the first codeword. The communications manager 1020 is capable of, configured to, or operable to support a means for processing a first portion of the first codeword from resource elements of a first subband of the set of time-frequency resources in a frequency-first, time-second manner and a second portion of the first codeword from resource elements of a second subband of the set of time-frequency resources in the frequency-first, time-second manner, where the first portion of the first codeword includes a contiguous portion of the first codeword that precedes the second portion of the first codeword.

By including or configuring the communications manager 1020 in accordance with examples as described herein, the device 1005 (e.g., at least one processor controlling or otherwise coupled with the receiver 1010, the transmitter 1015, the communications manager 1020, or a combination thereof) may support techniques for reduced processing, reduced power consumption, and more efficient utilization of communication resources.

Figure 11:
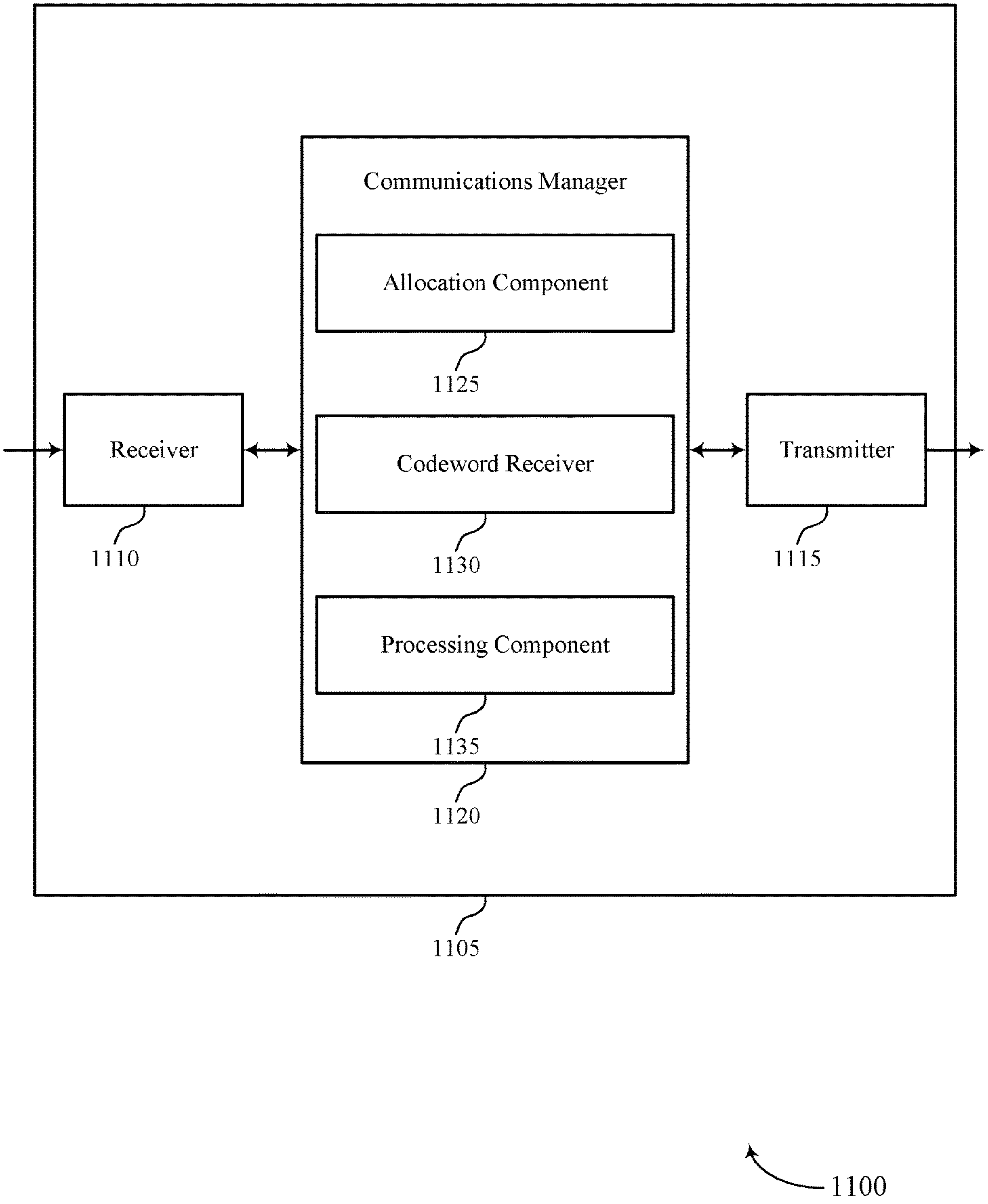

FIG. 11 shows a block diagram 1100 of a device 1105 that supports time frequency resource mapping for wideband systems in accordance with one or more aspects of the present disclosure. The device 1105 may be an example of aspects of a device 1005 or a UE 115 as described herein. The device 1105 may include a receiver 1110, a transmitter 1115, and a communications manager 1120. The device 1105, or one or more components of the device 1105 (e.g., the receiver 1110, the transmitter 1115, and the communications manager 1120), may include at least one processor, which may be coupled with at least one memory, to support the described techniques. Each of these components may be in communication with one another (e.g., via one or more buses).

The receiver 1110 may provide a means for receiving information such as packets, user data, control information, or any combination thereof associated with various information channels (e.g., control channels, data channels, information channels related to time frequency resource mapping for wideband systems). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to time frequency resource mapping for wideband systems). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of time frequency resource mapping for wideband systems as described herein. For example, the communications manager 1120 may include an allocation component 1125, a codeword receiver 1130, a processing component 1135, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications in accordance with examples as disclosed herein. The allocation component 1125 is capable of, configured to, or operable to support a means for communicating an allocation of a set of time-frequency resources of a carrier for transmission of a first codeword. The codeword receiver 1130 is capable of, configured to, or operable to support a means for receiving, within the set of time-frequency resources, the first codeword. The processing component 1135 is capable of, configured to, or operable to support a means for processing a first portion of the first codeword from resource elements of a first subband of the set of time-frequency resources in a frequency-first, time-second manner and a second portion of the first codeword from resource elements of a second subband of the set of time-frequency resources in the frequency-first, time-second manner, where the first portion of the first codeword includes a contiguous portion of the first codeword that precedes the second portion of the first codeword.

Figure 12:
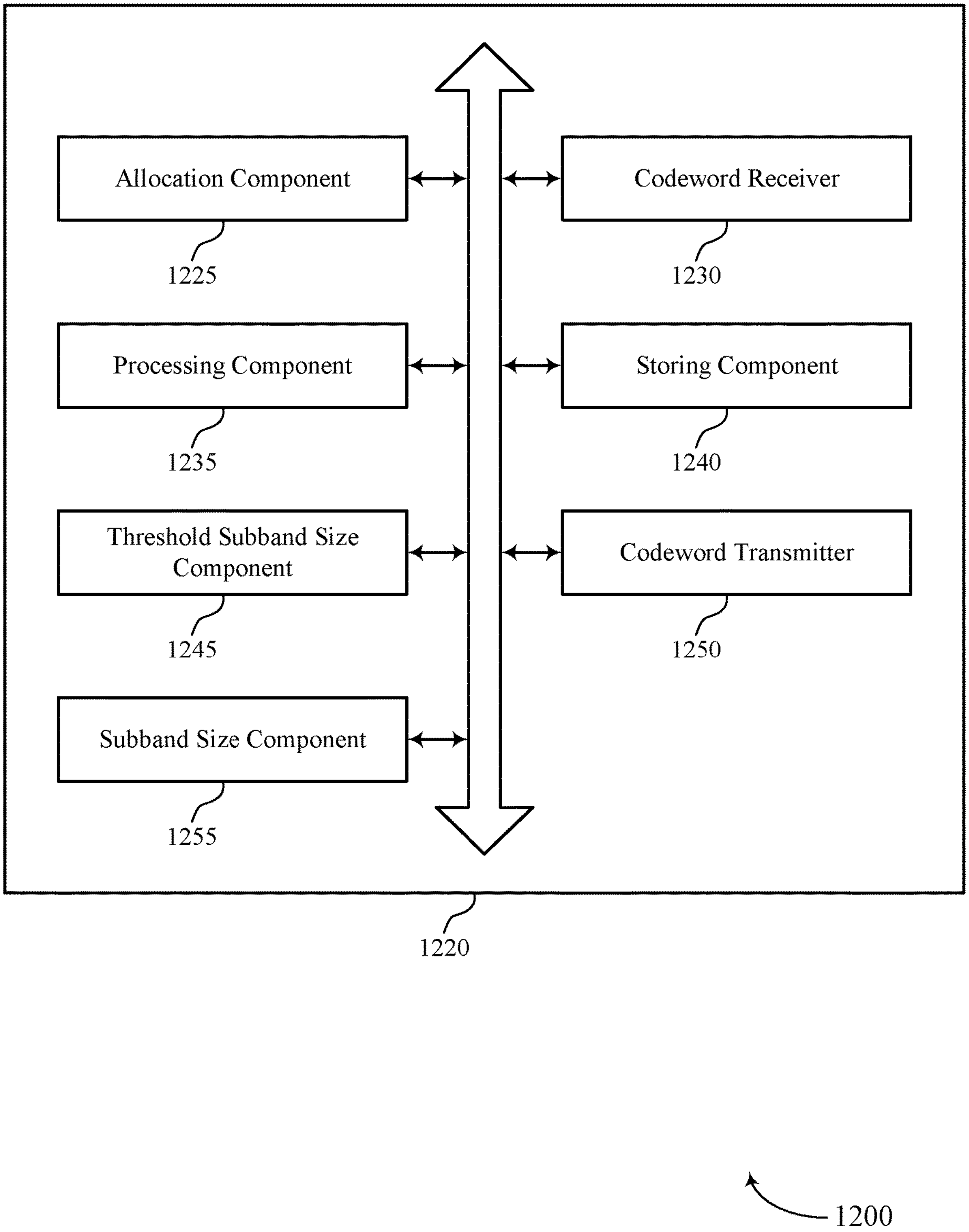
FIG. 12 shows a block diagram of a communications manager that supports time frequency resource mapping for wideband systems in accordance with one or more aspects of the present disclosure.

FIG. 12 shows a block diagram 1200 of a communications manager 1220 that supports time frequency resource mapping for wideband systems in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of time frequency resource mapping for wideband systems as described herein. For example, the communications manager 1220 may include an allocation component 1225, a codeword receiver 1230, a processing component 1235, a storing component 1240, a threshold subband size component 1245, a codeword transmitter 1250, a subband size component 1255, or any combination thereof. Each of these components, or components or subcomponents thereof (e.g., one or more processors, one or more memories), may communicate, directly or indirectly, with one another (e.g., via one or more buses).

The communications manager 1220 may support wireless communications in accordance with examples as disclosed herein. The allocation component 1225 is capable of, configured to, or operable to support a means for communicating an allocation of a set of time-frequency resources of a carrier for transmission of a first codeword. The codeword receiver 1230 is capable of, configured to, or operable to support a means for receiving, within the set of time-frequency resources, the first codeword. The processing component 1235 is capable of, configured to, or operable to support a means for processing a first portion of the first codeword from resource elements of a first subband of the set of time-frequency resources in a frequency-first, time-second manner and a second portion of the first codeword from resource elements of a second subband of the set of time-frequency resources in the frequency-first, time-second manner, where the first portion of the first codeword includes a contiguous portion of the first codeword that precedes the second portion of the first codeword.

In some examples, the storing component 1240 is capable of, configured to, or operable to support a means for storing one or more first channel estimates associated with the first subband based on the processing. In some examples, the storing component 1240 is capable of, configured to, or operable to support a means for storing one or more second channel estimates associated with the second subband based on the processing, where storing the one or more second channel estimates includes overwriting at least a portion of the stored one or more first channel estimates.

In some examples, the first codeword includes a set of multiple code blocks, and where of the first portion of the first codeword includes a first subset of the set of multiple code blocks and the second portion of the first codeword includes a second subset of the set of multiple code blocks, and where the first subset and the second subset of the set of multiple code blocks are disjoint subsets.

In some examples, a first code block of the second subset of the set of multiple code blocks begins on a first resource element of the second subband.

In some examples, the threshold subband size component 1245 is capable of, configured to, or operable to support a means for transmitting an indication of a threshold subband size, where a size of the first subband, the second subband, or both are based on the indication.

In some examples, the indication includes a capability associated with a component carrier size or a quantity of layers.

In some examples, the codeword transmitter 1250 is capable of, configured to, or operable to support a means for transmitting one or more second codewords via a second set of time-frequency resources, where a first portion of the one or more second codewords is mapped across frequency resources of a first time resource of the second set of time-frequency resources prior to mapping of a second portion of the one or more second codewords across the frequency resources of a second time resource of the second set of time-frequency resources.

In some examples, the subband size component 1255 is capable of, configured to, or operable to support a means for communicating an indication of a subband size associated with the first subband, the second subband, or both.

In some examples, the indication of the subband size is communicated via an RRC message, a DCI message, a UCI message, or MAC-CE message.

In some examples, receiving the first codeword includes receiving the first codeword across one or more first spatial layers.

In some examples, the codeword receiver 1230 is capable of, configured to, or operable to support a means for receiving a second codeword via one or more second spatial layers, where the one or more second spatial layers and the one or more first spatial layers are different.

Figure 13:
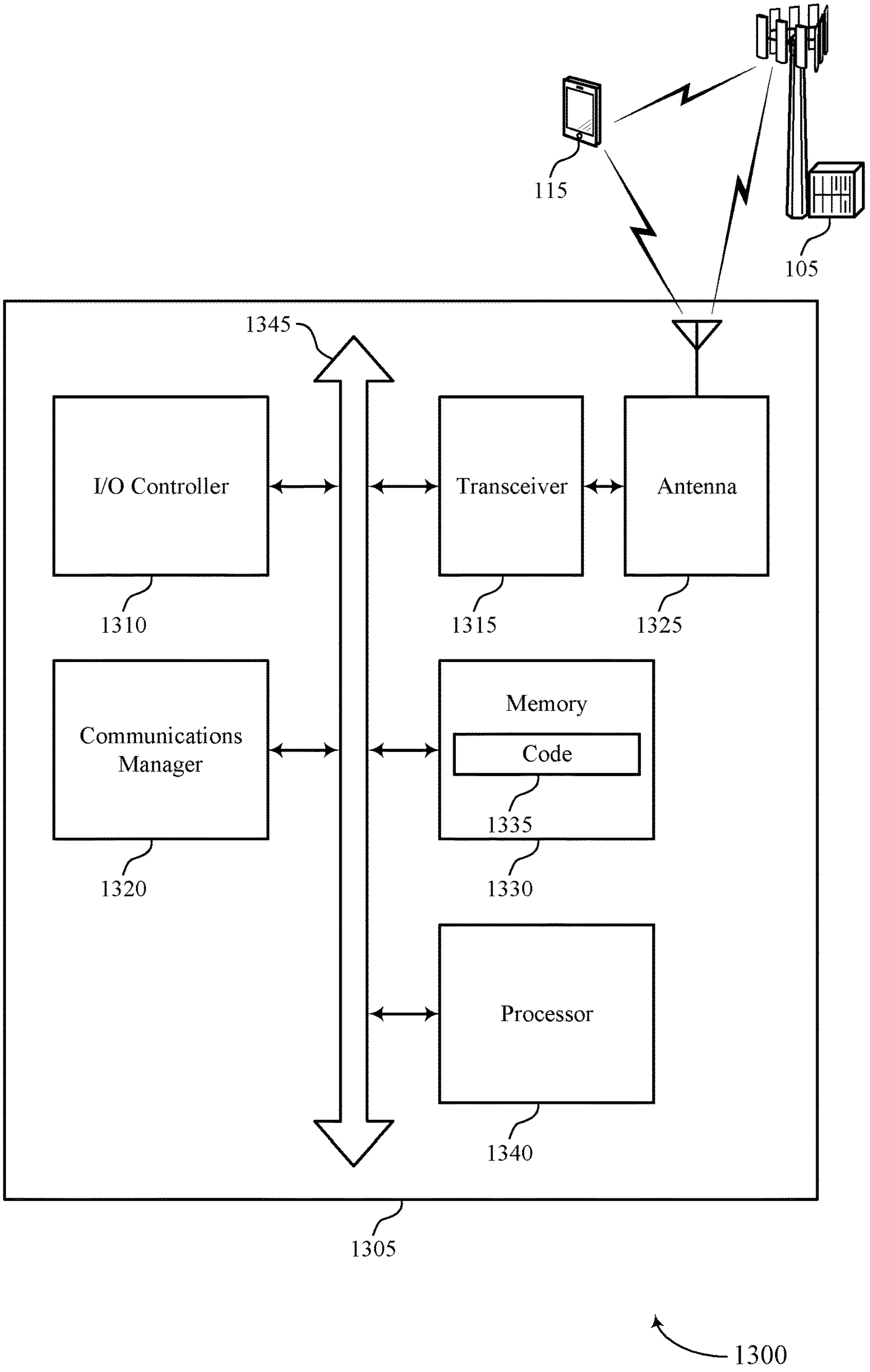
FIG. 13 shows a diagram of a system including a device that supports time frequency resource mapping for wideband systems in accordance with one or more aspects of the present disclosure.

FIG. 13 shows a diagram of a system 1300 including a device 1305 that supports time frequency resource mapping for wideband systems in accordance with one or more aspects of the present disclosure. The device 1305 may be an example of or include the components of a device 1005, a device 1105, or a UE 115 as described herein. The device 1305 may communicate (e.g., wirelessly) with one or more network entities 105, one or more UEs 115, or any combination thereof. The device 1305 may include components for bi-directional voice and data communications including components for transmitting and receiving communications, such as a communications manager 1320, an input/output (I/O) controller 1310, a transceiver 1315, an antenna 1325, at least one memory 1330, code 1335, and at least one processor 1340. These components may be in electronic communication or otherwise coupled (e.g., operatively, communicatively, functionally, electronically, electrically) via one or more buses (e.g., a bus 1345).

The I/O controller 1310 may manage input and output signals for the device 1305. The I/O controller 1310 may also manage peripherals not integrated into the device 1305. In some cases, the I/O controller 1310 may represent a physical connection or port to an external peripheral. In some cases, the I/O controller 1310 may utilize an operating system such as iOS®, ANDROID®, MS-DOS®, MS-WINDOWS®, OS/2®, UNIX®, LINUX®, or another known operating system. Additionally, or alternatively, the I/O controller 1310 may represent or interact with a modem, a keyboard, a mouse, a touchscreen, or a similar device. In some cases, the I/O controller 1310 may be implemented as part of one or more processors, such as the at least one processor 1340. In some cases, a user may interact with the device 1305 via the I/O controller 1310 or via hardware components controlled by the I/O controller 1310.

In some cases, the device 1305 may include a single antenna 1325. However, in some other cases, the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The at least one memory 1330 may include random access memory (RAM) and read-only memory (ROM). The at least one memory 1330 may store computer-readable, computer-executable code 1335 including instructions that, when executed by the at least one processor 1340, cause the device 1305 to perform various functions described herein. The code 1335 may be stored in a non-transitory computer-readable medium such as system memory or another type of memory. In some cases, the code 1335 may not be directly executable by the at least one processor 1340 but may cause a computer (e.g., when compiled and executed) to perform functions described herein. In some cases, the at least one memory 1330 may contain, among other things, a basic I/O system (BIOS) which may control basic hardware or software operation such as the interaction with peripheral components or devices.

The at least one processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 1340 may be configured to operate a memory array using a memory controller. In some other cases, a memory controller may be integrated into the at least one processor 1340. The at least one processor 1340 may be configured to execute computer-readable instructions stored in a memory (e.g., the at least one memory 1330) to cause the device 1305 to perform various functions (e.g., functions or tasks supporting time frequency resource mapping for wideband systems). For example, the device 1305 or a component of the device 1305 may include at least one processor 1340 and at least one memory 1330 coupled with or to the at least one processor 1340, the at least one processor 1340 and at least one memory 1330 configured to perform various functions described herein. In some examples, the at least one processor 1340 may include multiple processors and the at least one memory 1330 may include multiple memories. One or more of the multiple processors may be coupled with one or more of the multiple memories, which may, individually or collectively, be configured to perform various functions herein. In some examples, the at least one processor 1340 may be a component of a processing system, which may refer to a system (such as a series) of machines, circuitry (including, for example, one or both of processor circuitry (which may include the at least one processor 1340) and memory circuitry (which may include the at least one memory 1330)), or components, that receives or obtains inputs and processes the inputs to produce, generate, or obtain a set of outputs. The processing system may be configured to perform one or more of the functions described herein. As such, the at least one processor 1340 or a processing system including the at least one processor 1340 may be configured to, configurable to, or operable to cause the device 1305 to perform one or more of the functions described herein. Further, as described herein, being "configured to," being "configurable to," and being "operable to" may be used interchangeably and may be associated with a capability, when executing code stored in the at least one memory 1330 or otherwise, to perform one or more of the functions described herein.

The communications manager 1320 may support wireless communications in accordance with examples as disclosed herein. For example, the communications manager 1320 is capable of, configured to, or operable to support a means for communicating an allocation of a set of time-frequency resources of a carrier for transmission of a first codeword. The communications manager 1320 is capable of, configured to, or operable to support a means for receiving, within the set of time-frequency resources, the first codeword. The communications manager 1320 is capable of, configured to, or operable to support a means for processing a first portion of the first codeword from resource elements of a first subband of the set of time-frequency resources in a frequency-first, time-second manner and a second portion of the first codeword from resource elements of a second subband of the set of time-frequency resources in the frequency-first, time-second manner, where the first portion of the first codeword includes a contiguous portion of the first codeword that precedes the second portion of the first codeword.

By including or configuring the communications manager 1320 in accordance with examples as described herein, the device 1305 may support techniques for reduced latency, improved user experience related to reduced processing, reduced power consumption, more efficient utilization of communication resources, improved coordination between devices, longer battery life, and improved utilization of processing capability.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the at least one processor 1340, the at least one memory 1330, the code 1335, or any combination thereof. For example, the code 1335 may include instructions executable by the at least one processor 1340 to cause the device 1305 to perform various aspects of time frequency resource mapping for wideband systems as described herein, or the at least one processor 1340 and the at least one memory 1330 may be otherwise configured to, individually or collectively, perform or support such operations.

Figure 14:
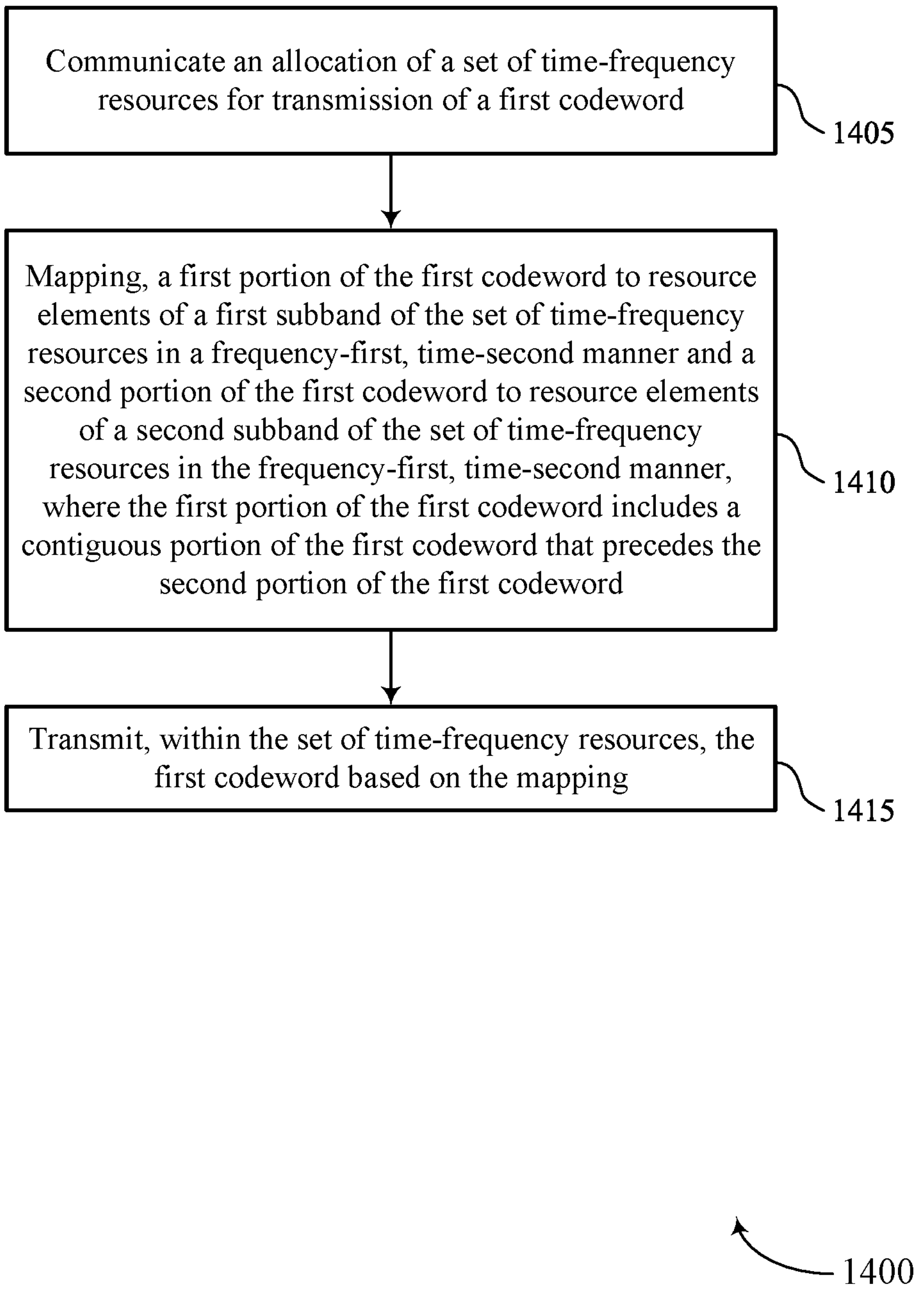
FIGS. 14 through 17 show flowcharts illustrating methods that support time frequency resource mapping for wideband systems in accordance with one or more aspects of the present disclosure.

FIG. 14 shows a flowchart illustrating a method 1400 that supports time frequency resource mapping for wideband systems in accordance with aspects of the present disclosure. The operations of the method 1400 may be implemented by a network entity or its components as described herein. For example, the operations of the method 1400 may be performed by a network entity as described with reference to FIGS. 1 through 9. In some examples, a network entity may execute a set of instructions to control the functional elements of the network entity to perform the described functions. Additionally, or alternatively, the network entity may perform aspects of the described functions using special-purpose hardware.

At 1405, the method may include communicating an allocation of a set of time-frequency resources of a carrier for transmission of a first codeword. The operations of block 1405 may be performed in accordance with examples as disclosed herein. In some examples, aspects of the operations of 1405 may be performed by an allocation component 825 as described with reference to FIG. 8.

At 1410, the method may include mapping, a first portion of the first codeword to resource elements of a first subband of the set of time-frequency resources in a frequency-first, time-second manner and a second portion of the first codeword to resource elements of a second subband of the set of time-frequency resources in the frequency-first, time-second manner, where the first portion of the first codeword includes a contiguous portion of the first codeword that precedes the second portion of the first codeword. The operations of block 1410 may be performed in accordance with examples as disclosed herein. In some examples, aspects of the operations of 1410 may be performed by a mapping component 830 as described with reference to FIG. 8.

At 1415, the method may include transmitting, within the set of time-frequency resources, the first codeword based on the mapping. The operations of block 1415 may be performed in accordance with examples as disclosed herein. In some examples, aspects of the operations of 1415 may be performed by a codeword transmitter 835 as described with reference to FIG. 8.

Figure 15:
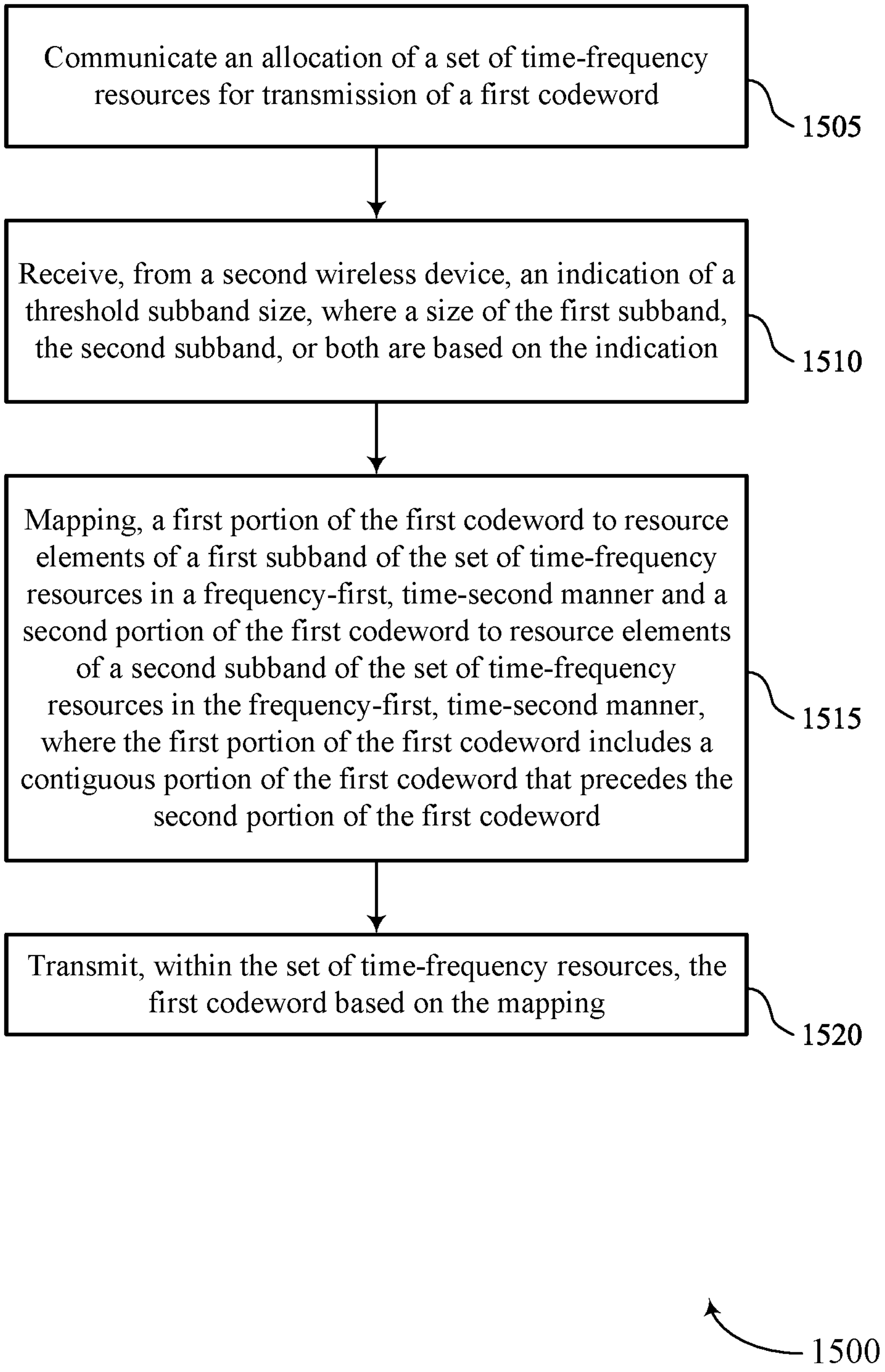

FIG. 15 shows a flowchart illustrating a method 1500 that supports time frequency resource mapping for wideband systems in accordance with aspects of the present disclosure. The operations of the method 1500 may be implemented by a network entity or its components as described herein. For example, the operations of the method 1500 may be performed by a network entity as described with reference to FIGS. 1 through 9. In some examples, a network entity may execute a set of instructions to control the functional elements of the network entity to perform the described functions. Additionally, or alternatively, the network entity may perform aspects of the described functions using special-purpose hardware.

At 1505, the method may include communicating an allocation of a set of time-frequency resources of a carrier for transmission of a first codeword. The operations of block 1505 may be performed in accordance with examples as disclosed herein. In some examples, aspects of the operations of 1505 may be performed by an allocation component 825 as described with reference to FIG. 8.

At 1510, the method may include receiving, from a second wireless device, an indication of a threshold subband size, where a size of the first subband, the second subband, or both are based on the indication. The operations of block 1510 may be performed in accordance with examples as disclosed herein. In some examples, aspects of the operations of 1510 may be performed by a threshold subband size component 840 as described with reference to FIG. 8.

At 1515, the method may include mapping, a first portion of the first codeword to resource elements of a first subband of the set of time-frequency resources in a frequency-first, time-second manner and a second portion of the first codeword to resource elements of a second subband of the set of time-frequency resources in the frequency-first, time-second manner, where the first portion of the first codeword includes a contiguous portion of the first codeword that precedes the second portion of the first codeword. The operations of block 1515 may be performed in accordance with examples as disclosed herein. In some examples, aspects of the operations of 1515 may be performed by a mapping component 830 as described with reference to FIG. 8.

At 1520, the method may include transmitting, within the set of time-frequency resources, the first codeword based on the mapping. The operations of block 1520 may be performed in accordance with examples as disclosed herein. In some examples, aspects of the operations of 1520 may be performed by a codeword transmitter 835 as described with reference to FIG. 8.

Figure 16:
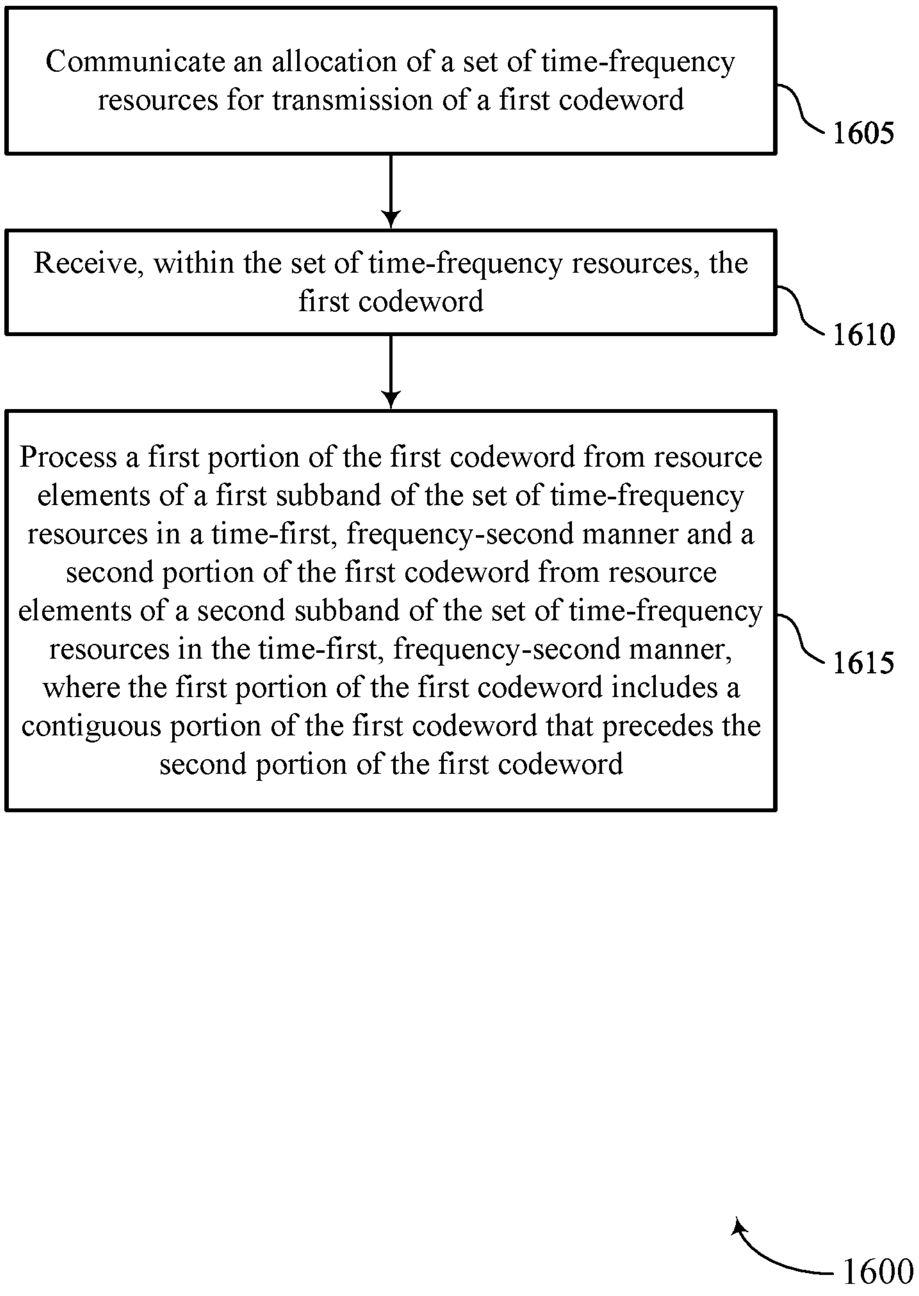

FIG. 16 shows a flowchart illustrating a method 1600 that supports time frequency resource mapping for wideband systems in accordance with aspects of the present disclosure. The operations of the method 1600 may be implemented by a UE or its components as described herein. For example, the operations of the method 1600 may be performed by a UE 115 as described with reference to FIGS. 1 through 5 and 10 through 13. In some examples, a UE may execute a set of instructions to control the functional elements of the UE to perform the described functions. Additionally, or alternatively, the UE may perform aspects of the described functions using special-purpose hardware.

At 1605, the method may include communicating an allocation of a set of time-frequency resources of a carrier for transmission of a first codeword. The operations of block 1605 may be performed in accordance with examples as disclosed herein. In some examples, aspects of the operations of 1605 may be performed by an allocation component 1225 as described with reference to FIG. 12.

At 1610, the method may include receiving, within the set of time-frequency resources, the first codeword. The operations of block 1610 may be performed in accordance with examples as disclosed herein. In some examples, aspects of the operations of 1610 may be performed by a codeword receiver 1230 as described with reference to FIG. 12.

At 1615, the method may include processing a first portion of the first codeword from resource elements of a first subband of the set of time-frequency resources in a frequency-first, time-second manner and a second portion of the first codeword from resource elements of a second subband of the set of time-frequency resources in the frequency-first, time-second manner, where the first portion of the first codeword includes a contiguous portion of the first codeword that precedes the second portion of the first codeword. The operations of block 1615 may be performed in accordance with examples as disclosed herein. In some examples, aspects of the operations of 1615 may be performed by a processing component 1235 as described with reference to FIG. 12.

Figure 17:
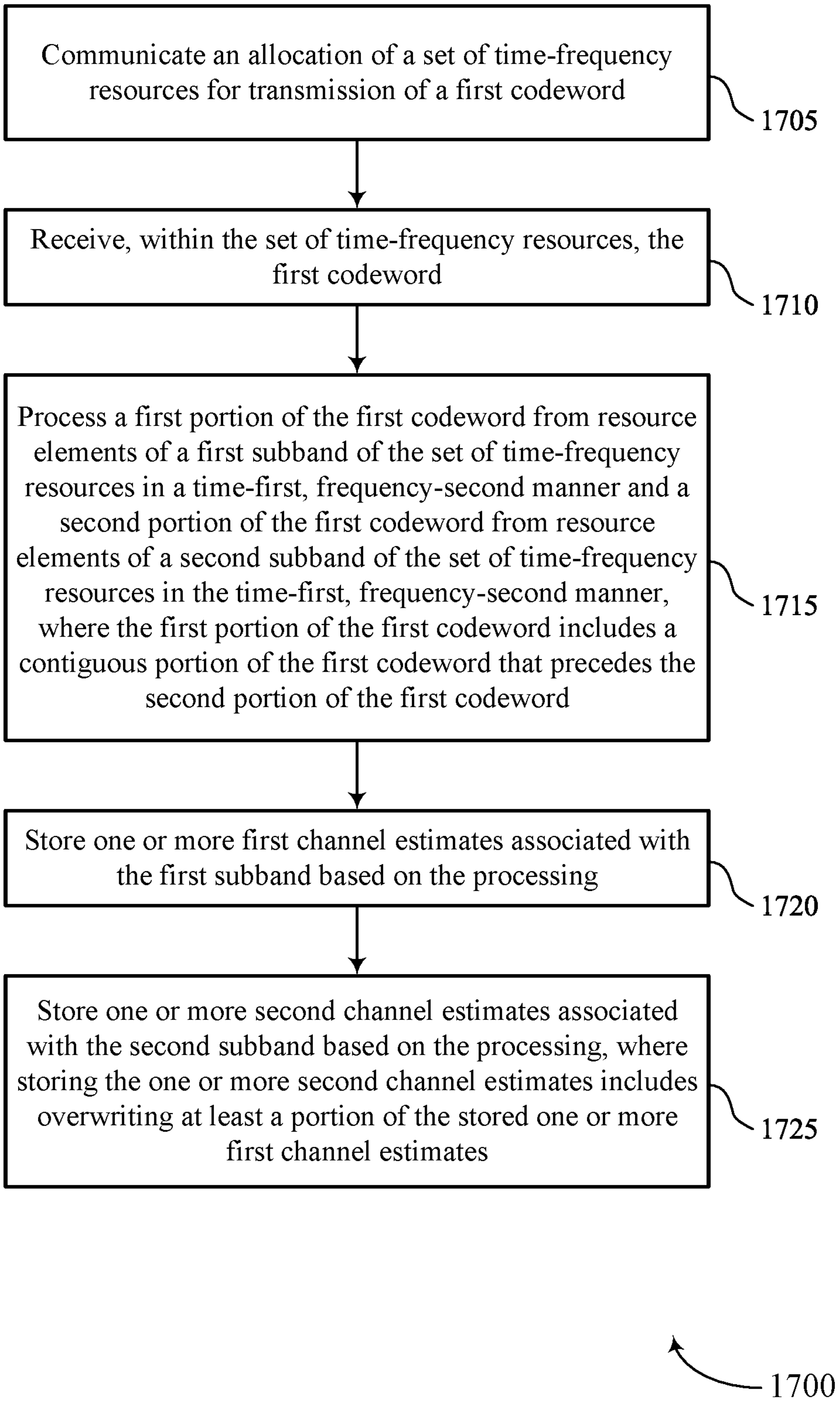

FIG. 17 shows a flowchart illustrating a method 1700 that supports time frequency resource mapping for wideband systems in accordance with aspects of the present disclosure. The operations of the method 1700 may be implemented by a UE or its components as described herein. For example, the operations of the method 1700 may be performed by a UE 115 as described with reference to FIGS. 1 through 5 and 10 through 13. In some examples, a UE may execute a set of instructions to control the functional elements of the UE to perform the described functions. Additionally, or alternatively, the UE may perform aspects of the described functions using special-purpose hardware.

At 1705, the method may include communicating an allocation of a set of time-frequency resources of a carrier for transmission of a first codeword. The operations of block 1705 may be performed in accordance with examples as disclosed herein. In some examples, aspects of the operations of 1705 may be performed by an allocation component 1225 as described with reference to FIG. 12.

At 1710, the method may include receiving, within the set of time-frequency resources, the first codeword. The operations of block 1710 may be performed in accordance with examples as disclosed herein. In some examples, aspects of the operations of 1710 may be performed by a codeword receiver 1230 as described with reference to FIG. 12.

At 1715, the method may include processing a first portion of the first codeword from resource elements of a first subband of the set of time-frequency resources in a frequency-first, time-second manner and a second portion of the first codeword from resource elements of a second subband of the set of time-frequency resources in the frequency-first, time-second manner, where the first portion of the first codeword includes a contiguous portion of the first codeword that precedes the second portion of the first codeword. The operations of block 1715 may be performed in accordance with examples as disclosed herein. In some examples, aspects of the operations of 1715 may be performed by a processing component 1235 as described with reference to FIG. 12.

At 1720, the method may include storing one or more first channel estimates associated with the first subband based on the processing. The operations of block 1720 may be performed in accordance with examples as disclosed herein. In some examples, aspects of the operations of 1720 may be performed by a storing component 1240 as described with reference to FIG. 12.

At 1725, the method may include storing one or more second channel estimates associated with the second subband based on the processing, where storing the one or more second channel estimates includes overwriting at least a portion of the stored one or more first channel estimates. The operations of block 1725 may be performed in accordance with examples as disclosed herein. In some examples, aspects of the operations of 1725 may be performed by a storing component 1240 as described with reference to FIG. 12.

The following provides an overview of aspects of the present disclosure:

Aspect 1: A method for wireless communications at a first wireless device, comprising: communicating an allocation of a set of time-frequency resources for transmission of a first codeword; mapping, a first portion of the first codeword to resource elements of a first subband of the set of time-frequency resources in a frequency-first, time-second manner and a second portion of the first codeword to resource elements of a second subband of the set of time-frequency resources in the frequency-first, time-second manner, wherein the first portion of the first codeword comprises a contiguous portion of the first codeword that precedes the second portion of the first codeword; and transmitting, within the set of time-frequency resources, the first codeword based at least in part on the mapping.

Aspect 2: The method of aspect 1, wherein the first codeword comprises a plurality of code blocks, and wherein of the first portion of the first codeword comprises a first subset of the plurality of code blocks and the second portion of the first codeword comprises a second subset of the plurality of code blocks, and wherein the first subset and the second subset of the plurality of code blocks are disjoint subsets.

Aspect 3: The method of aspect 2, wherein a first code block of the second subset of the plurality of code blocks begins on a first resource element of the second subband.

Aspect 4: The method of any of aspects 1 through 3, further comprising: receiving, from a second wireless device, an indication of a threshold subband size, wherein a size of the first subband, the second subband, or both are based at least in part on the indication.

Aspect 5: The method of aspect 4, wherein the indication comprises a capability associated with a component carrier size or a quantity of layers.

Aspect 6: The method of any of aspects 1 through 5, further comprising: communicating an indication of a configuration for mapping the first codeword according to a set of subbands, the set of subbands comprising the first subband and the second subband.

Aspect 7: The method of any of aspects 1 through 6, further comprising: receiving one or more second codewords via a second set of time-frequency resources, wherein a first portion of the one or more second codewords is mapped across frequency resources of a first time resource of the second set of time-frequency resources prior to mapping of a second portion of the one or more second codewords across the frequency resources of a second time resource of the second set of time-frequency resources.

Aspect 8: The method of any of aspects 1 through 7, wherein mapping the first codeword according to the first subband and the second subband is based at least in part on identifying a waveform type associated with transmitting the first codeword.

Aspect 9: The method of any of aspects 1 through 8, wherein communicating the allocation comprises communicating one or more parameters, and wherein mapping the first codeword according to the first subband and the second subband is based at least in part on the one or more parameters.

Aspect 10: The method of aspect 9, wherein the one or more parameters comprise a quantity of layers, and wherein mapping the first codeword according to the first subband and the second subband is based at least in part on the quantity of layers exceeding a threshold quantity of layers.

Aspect 11: The method of any of aspects 9 through 10, wherein the one or more parameters comprise a transmission bandwidth, and wherein mapping the first codeword according to the first subband and the second subband is based at least in part on the transmission bandwidth exceeding a threshold transmission bandwidth.

Aspect 12: The method of any of aspects 1 through 11, further comprising: communicating an indication of a subband size associated with the first subband, the second subband, or both.

Aspect 13: The method of aspect 12, wherein the indication of the subband size is communicated via an RRC message, a DCI message, a UCI message, or a MAC-CE message.

Aspect 14: The method of any of aspects 1 through 13, further comprising: determining a subband size associated with the first subband, the second subband, or both based at least in part on one or more parameters associated with the transmission.

Aspect 15: The method of aspect 14, wherein one or more parameters comprise one or more layers, one or more symbols, a scheduled bandwidth, or a combination thereof.

Aspect 16: The method of any of aspects 1 through 15, wherein each of a plurality of virtual subbands of the set of time-frequency resources are associated with a respective set of virtual resources comprising a plurality of virtual resource blocks, wherein the plurality of virtual subbands comprises at least the first subband and the second subband, and wherein, for each of a plurality of physical resource block groups of a set of physical resources, the mapping further comprises: mapping respective sets of virtual resource blocks to each physical resource block group, wherein the respective sets of virtual resource blocks mapped to each of the physical resource block groups are from a same subband of the plurality of subbands or one or more consecutive subbands of the plurality of subbands.

Aspect 17: The method of any of aspects 1 through 16, wherein transmitting the first codeword comprises transmitting the first codeword via one or more first spatial layers.

Aspect 18: The method of aspect 17, wherein mapping the first codeword further comprises: mapping the first codeword to resource elements of the one or more first spatial layers; and mapping, based at least in part on mapping the first codeword to the resource elements of the one or more first spatial layers, the first portion of the first codeword to the resource elements of the first subband and the second portion of the first codeword to the resource elements of the second subband.

Aspect 19: The method of any of aspects 17 through 18, further comprising: transmitting a second codeword via one or more second spatial layers, wherein the one or more second spatial layers and the one or more first spatial layers are different.

Aspect 20: A method for wireless communications at a second wireless device, comprising: communicating an allocation of a set of time-frequency resources for transmission of a first codeword; receiving, within the set of time-frequency resources, the first codeword; and processing a first portion of the first codeword from resource elements of a first subband of the set of time-frequency resources in a time-first, frequency-second manner and a second portion of the first codeword from resource elements of a second subband of the set of time-frequency resources in the time-first, frequency-second manner, wherein the first portion of the first codeword comprises a contiguous portion of the first codeword that precedes the second portion of the first codeword.

Aspect 21: The method of aspect 20, further comprising: storing one or more first channel estimates associated with the first subband based at least in part on the processing; and storing one or more second channel estimates associated with the second subband based at least in part on the processing, wherein storing the one or more second channel estimates comprises overwriting at least a portion of the stored one or more first channel estimates.

Aspect 22: The method of any of aspects 20 through 21, wherein the first codeword comprises a plurality of code blocks, and wherein of the first portion of the first codeword comprises a first subset of the plurality of code blocks and the second portion of the first codeword comprises a second subset of the plurality of code blocks, and wherein the first subset and the second subset of the plurality of code blocks are disjoint subsets.

Aspect 23: The method of aspect 22, wherein a first code block of the second subset of the plurality of code blocks begins on a first resource element of the second subband.

Aspect 24: The method of any of aspects 20 through 23, further comprising: transmitting an indication of a threshold subband size, wherein a size of the first subband, the second subband, or both are based at least in part on the indication.

Aspect 25: The method of aspect 24, wherein the indication comprises a capability associated with a component carrier size or a quantity of layers.

Aspect 26: The method of any of aspects 20 through 25, further comprising: transmitting one or more second codewords via a second set of time-frequency resources, wherein a first portion of the one or more second codewords is mapped across frequency resources of a first time resource of the second set of time-frequency resources prior to mapping of a second portion of the one or more second codewords across the frequency resources of a second time resource of the second set of time-frequency resources.

Aspect 27: The method of any of aspects 20 through 26, further comprising: communicating an indication of a subband size associated with the first subband, the second subband, or both.

Aspect 28: The method of aspect 27, wherein the indication of the subband size is communicated via an RRC message, a DCI message, a UCI message, or a MAC-CE message.

Aspect 29: The method of any of aspects 20 through 28, wherein receiving the first codeword comprises receiving the first codeword across one or more first spatial layers.

Aspect 30: The method of any of aspects 20 through 29, further comprising: receiving a second codeword via one or more second spatial layers, wherein the one or more second spatial layers and the one or more first spatial layers are different.

Aspect 31: A first wireless device for wireless communications, comprising one or more memories storing processor-executable code, and one or more processors coupled with the one or more memories and individually or collectively operable to execute the code to cause the first wireless device to perform a method of any of aspects 1 through 19.

Aspect 32: A first wireless device for wireless communications, comprising at least one means for performing a method of any of aspects 1 through 19.

Aspect 33: A non-transitory computer-readable medium storing code for wireless communications, the code comprising instructions executable by a processor to perform a method of any of aspects 1 through 19.

Aspect 34: A second wireless device for wireless communications, comprising one or more memories storing processor-executable code, and one or more processors coupled with the one or more memories and individually or collectively operable to execute the code to cause the second wireless device to perform a method of any of aspects 20 through 30.

Aspect 35: A second wireless device for wireless communications, comprising at least one means for performing a method of any of aspects 20 through 30.

Aspect 36: A non-transitory computer-readable medium storing code for wireless communications, the code comprising instructions executable by a processor to perform a method of any of aspects 20 through 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer.

By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A first wireless device, comprising:

one or more memories storing processor-executable code; and one or more processors coupled with the one or more memories and individually or collectively operable to execute the code to cause the first wireless device to:

communicate an allocation of a set of time-frequency resources for transmission of a first codeword;

receive, from a second wireless device, an indication of a threshold subband size;

determine a size of a first subband, a second subband, or both based at least in part on the indication of the threshold subband size received from the second wireless device;

map a first portion of the first codeword to resource elements of the first subband of the set of time-frequency resources in a frequency-first, time-second manner and a second portion of the first codeword to resource elements of the second subband of the set of time-frequency resources in the frequency-first, time-second manner, wherein the first portion of the first codeword comprises a contiguous portion of the first codeword that precedes the second portion of the first codeword; and transmit, within the set of time-frequency resources, the first codeword based at least in part on the mapping.

2. The first wireless device of claim 1, wherein the first codeword comprises a plurality of code blocks, and wherein the first portion of the first codeword comprises a first subset of the plurality of code blocks and the second portion of the first codeword comprises a second subset of the plurality of code blocks, and wherein the first subset and the second subset of the plurality of code blocks are disjoint subsets.

3. The first wireless device of claim 2, wherein a first code block of the second subset of the plurality of code blocks begins on a first resource element of the second subband.

4. The first wireless device of claim 1, wherein the indication comprises a capability associated with a component carrier size or a quantity of layers.

5. The first wireless device of claim 1, wherein the one or more processors are individually or collectively further operable to execute the code to cause the first wireless device to:

communicate an indication of a configuration for mapping the first codeword according to a set of subbands, the set of subbands comprising the first subband and the second subband.

6. The first wireless device of claim 1, wherein the one or more processors are individually or collectively further operable to execute the code to cause the first wireless device to:

receive one or more second codewords via a second set of time-frequency resources, wherein a first portion of the one or more second codewords is mapped across frequency resources of a first time resource of the second set of time-frequency resources prior to mapping of a second portion of the one or more second codewords across the frequency resources of a second time resource of the second set of time-frequency resources.

7. The first wireless device of claim 1, wherein mapping the first codeword according to the first subband and the second subband is based at least in part on identifying a waveform type associated with transmitting the first codeword.

8. The first wireless device of claim 1, wherein communicating the allocation comprises communicating one or more parameters, and wherein mapping the first codeword according to the first subband and the second subband is based at least in part on the one or more parameters.

9. The first wireless device of claim 8, wherein the one or more parameters comprise a quantity of layers, and wherein mapping the first codeword according to the first subband and the second subband is based at least in part on the quantity of layers exceeding a threshold quantity of layers.

10. The first wireless device of claim 8, wherein the one or more parameters comprise a transmission bandwidth, and wherein mapping the first codeword according to the first subband and the second subband is based at least in part on the transmission bandwidth exceeding a threshold transmission bandwidth.

11. The first wireless device of claim 1, wherein the one or more processors are individually or collectively further operable to execute the code to cause the first wireless device to:

communicate an indication of a subband size associated with the first subband, the second subband, or both.

12. The first wireless device of claim 11, wherein the indication of the subband size is communicated via a radio resource control (RRC) message, a downlink control information (DCI) message, an uplink control information (UCI) message, or a medium access control-control element (MAC-CE) message.

13. The first wireless device of claim 1, wherein the one or more processors are individually or collectively further operable to execute the code to cause the first wireless device to:

determine a subband size associated with the first subband, the second subband, or both based at least in part on one or more parameters associated with the transmission.

14. The first wireless device of claim 13, wherein one or more parameters comprise one or more layers, one or more symbols, a scheduled bandwidth, or a combination thereof.

15. The first wireless device of claim 1, wherein each of a plurality of virtual subbands of the set of time-frequency resources are associated with a respective set of virtual resources comprising a plurality of virtual resource blocks, wherein the plurality of virtual subbands comprises at least the first subband and the second subband, and wherein, for each of a plurality of physical resource block groups of a set of physical resources, the one or more processors are individually or collectively further operable to execute the code to cause the first wireless device to:

map respective sets of virtual resource blocks to each physical resource block group, wherein the respective sets of virtual resource blocks mapped to each of the physical resource block groups are from a same subband of a plurality of subbands or one or more consecutive subbands of the plurality of subbands.

16. The first wireless device of claim 1, wherein transmitting the first codeword comprises transmitting the first codeword via one or more first spatial layers.

17. The first wireless device of claim 16, wherein, to map the first codeword, the one or more processors are individually or collectively further operable to execute the code to cause the first wireless device to:

map the first codeword to resource elements of the one or more first spatial layers in the frequency-first, time-second manner; and map, based at least in part on mapping the first codeword to the resource elements of the one or more first spatial layers, the first portion of the first codeword to the resource elements of the first subband in the frequency-first, time-second manner and the second portion of the first codeword to the resource elements of the second subband in the frequency-first, time-second manner.

18. The first wireless device of claim 16, wherein the one or more processors are individually or collectively further operable to execute the code to cause the first wireless device to:

transmit a second codeword via one or more second spatial layers, wherein the one or more second spatial layers and the one or more first spatial layers are different.

19. A second wireless device, comprising:

one or more memories storing processor-executable code; and one or more processors coupled with the one or more memories and individually or collectively operable to execute the code to cause the second wireless device to:

communicate an allocation of a set of time-frequency resources for transmission of a first codeword;

transmit, to a first wireless device, an indication of a threshold subband size;

receive, within the set of time-frequency resources, the first codeword; and process a first portion of the first codeword from resource elements of a first subband of the set of time-frequency resources in a frequency-first, time-second manner and a second portion of the first codeword from resource elements of a second subband of the set of time-frequency resources in the frequency-first, time-second manner, wherein the first portion of the first codeword comprises a contiguous portion of the first codeword that precedes the second portion of the first codeword, and wherein a size of the first subband, the second subband, or both are based at least in part on the indication of the threshold subband size transmitted to the first wireless device.

20. The second wireless device of claim 19, wherein the one or more processors are individually or collectively further operable to execute the code to cause the second wireless device to:

store one or more first channel estimates associated with the first subband based at least in part on the processing; and store one or more second channel estimates associated with the second subband based at least in part on the processing, wherein storing the one or more second channel estimates comprises overwriting at least a portion of the stored one or more first channel estimates.

21. The second wireless device of claim 19, wherein the first codeword comprises a plurality of code blocks, and wherein the first portion of the first codeword comprises a first subset of the plurality of code blocks and the second portion of the first codeword comprises a second subset of the plurality of code blocks, and wherein the first subset and the second subset of the plurality of code blocks are disjoint subsets.

22. The second wireless device of claim 21, wherein a first code block of the second subset of the plurality of code blocks begins on a first resource element of the second subband.

23. The second wireless device of claim 19, wherein the indication comprises a capability associated with a component carrier size or a quantity of layers.

24. The second wireless device of claim 19, wherein the one or more processors are individually or collectively further operable to execute the code to cause the second wireless device to:

transmit one or more second codewords via a second set of time-frequency resources, wherein a first portion of the one or more second codewords is mapped across frequency resources of a first time resource of the second set of time-frequency resources prior to mapping of a second portion of the one or more second codewords across the frequency resources of a second time resource of the second set of time-frequency resources.

25. The second wireless device of claim 19, wherein the one or more processors are individually or collectively further operable to execute the code to cause the second wireless device to:

communicate an indication of a subband size associated with the first subband, the second subband, or both.

26. The second wireless device of claim 25, wherein the indication of the subband size is communicated via a radio resource control (RRC) message, a downlink control information (DCI) message, an uplink control information (UCI) message, or a medium access control-control element (MAC-CE) message.

27. A method for wireless communications at a first wireless device, comprising:

communicating an allocation of a set of time-frequency resources for transmission of a first codeword;

receiving, from a second wireless device, an indication of a threshold subband size;

determining a size of a first subband, a second subband, or both based at least in part on the indication of the threshold subband size received from the second wireless device;

mapping, a first portion of the first codeword to resource elements of the first subband of the set of time-frequency resources in a frequency-first, time-second manner and a second portion of the first codeword to resource elements of the second subband of the set of time-frequency resources in the frequency-first, time-second manner, wherein the first portion of the first codeword comprises a contiguous portion of the first codeword that precedes the second portion of the first codeword; and transmitting, within the set of time-frequency resources, the first codeword based at least in part on the mapping.

28. A method for wireless communications at a second wireless device, comprising:

communicating an allocation of a set of time-frequency resources for transmission of a first codeword;

transmitting, to a first wireless device, an indication of a threshold subband size;

receiving, within the set of time-frequency resources, the first codeword; and processing a first portion of the first codeword from resource elements of a first subband of the set of time-frequency resources in a frequency-first, time-second manner and a second portion of the first codeword from resource elements of a second subband of the set of time-frequency resources in the frequency-first, time-second manner, wherein the first portion of the first codeword comprises a contiguous portion of the first codeword that precedes the second portion of the first codeword, and wherein a size of the first subband, the second subband, or both are based at least in part on the indication of the threshold subband size transmitted to the first wireless device.

* * * * *